(12) United States Patent
Fujimoto

(10) Patent No.: US 11,581,818 B2
(45) Date of Patent: Feb. 14, 2023

(54) DC VOLTAGE CONVERSION CIRCUIT AND POWER SUPPLY DEVICE

(71) Applicant: Alps Alpine Co., Ltd., Tokyo (JP)

(72) Inventor: Mitsunao Fujimoto, Miyagi-ken (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/848,720

(22) Filed: Jun. 24, 2022

(65) Prior Publication Data

US 2022/0321015 A1    Oct. 6, 2022

Related U.S. Application Data

(63) Continuation of application No. 17/016,507, filed on Sep. 10, 2020, now Pat. No. 11,381,174, which is a
(Continued)

(30) Foreign Application Priority Data

Mar. 20, 2018  (JP) .............................. JP2018-053020

(51) Int. Cl.
*H02M 3/337*    (2006.01)
*H02M 1/40*    (2007.01)
(Continued)

(52) U.S. Cl.
CPC .......... *H02M 3/3376* (2013.01); *H01F 27/24* (2013.01); *H02M 1/40* (2013.01);
(Continued)

(58) Field of Classification Search
CPC .......... H02M 3/3376; H02M 3/33569; H02M 3/33571; H02M 3/33573
See application file for complete search history.

(56) References Cited

U.S. PATENT DOCUMENTS

| 6,151,222 A | 11/2000 | Barrett |
| 7,706,153 B2 | 4/2010 | Nomnra et al. |

(Continued)

FOREIGN PATENT DOCUMENTS

| JP | 2000-232781 A | 8/2000 |
| JP | 2001-268906 | 9/2001 |

(Continued)

OTHER PUBLICATIONS

International Search Report and Written Opinion from corresponding international application No. PCT/JP2018/044428, 11 pgs., dated Feb. 19, 2019.

*Primary Examiner* — Adolf D Berhane
*Assistant Examiner* — Afework S Demisse
(74) *Attorney, Agent, or Firm* — Crowell & Moring LLP

(57) ABSTRACT

A direct-current voltage conversion circuit having on/off control with a dead-time period performed alternately on a first switch and a second switch included in a direct-current voltage conversion circuit. When alternating current flows in a series circuit part including two transformers magnetically independent, current flows in an output circuit including a secondary side of one transformer, and energy is accumulated in the other transformer. The permeabilities of the magnetic cores in the first and second transformers is between 15 and 120.

15 Claims, 16 Drawing Sheets

Related U.S. Application Data continuation of application No. PCT/JP2018/044428, filed on Dec. 3, 2018.

(51) Int. Cl.
*H01F 27/24* (2006.01)
*H02M 3/335* (2006.01)
*H01F 27/40* (2006.01)
*H02M 3/00* (2006.01)

(52) U.S. Cl.
CPC ....... *H02M 3/337* (2013.01); *H02M 3/33569* (2013.01); *H02M 3/33571* (2021.05); *H02M 3/33573* (2021.05); *H01F 27/40* (2013.01); *H01F 2027/408* (2013.01); *H02M 3/003* (2021.05); *H02M 3/01* (2021.05)

(56) References Cited

U.S. PATENT DOCUMENTS

| | | | |
|---|---|---|---|
| 8,014,177 B2 | 9/2011 | Nishikawa | |
| 2007/0053210 A1* | 3/2007 | Nomura | H02M 3/33571 363/16 |
| 2009/0109710 A1 | 4/2009 | Nakahori | |
| 2009/0184698 A1* | 7/2009 | Nishikawa | H02M 3/33571 323/282 |
| 2012/0033455 A1 | 2/2012 | Hosotani | |

FOREIGN PATENT DOCUMENTS

| | | |
|---|---|---|
| JP | 2003-272940 A | 9/2003 |
| JP | 2007-074830 | 3/2007 |
| JP | 2008-054378 A | 3/2008 |
| JP | 2009-136137 A | 6/2009 |
| JP | 2009-177875 | 8/2009 |
| JP | 5338225 B | 11/2013 |
| JP | 2016-213383 A | 12/2016 |

\* cited by examiner

DC VOLTAGE CONVERSION CIRCUIT AND POWER SUPPLY DEVICE

CLAIM OF PRIORITY

This application is a Continuation of U.S. patent application Ser. No. 17/016,507 filed Sep. 10, 2020, which is Continuation of International Application No. PCT/JP2018/044428 filed on Dec. 3, 2018, which claims benefit of priority to Japanese Patent Application No. 2018-053020 filed on Mar. 20, 2018. The entire contents of each application noted above are hereby incorporated by reference.

BACKGROUND

1. Field of the Disclosure

The present disclosure relates to a direct-current (DC) voltage conversion circuit that converts an input DC voltage and a power supply device including the DC voltage conversion circuit.

2. Description of the Related Art

Today, the amount of current used in vehicles is increasing, due to the electronization of control systems in vehicles or the incorporation of drive mechanisms including motors to vehicles. Thus, to handle high voltages in electric vehicles (EVs), plug-in hybrid electric vehicles (PHEVs), or the like, insulated and large-direct-current power supplies are required. Circuit systems based on technology of low-loss insulation-type soft switching have been used widely in order to accommodate the increase in the required amount of current in the above devices. Specific examples of such circuits include a zero-voltage switching phase shift converter, a zero-voltage switching active clamp converter, and a zero-current-switching logical link control (LLC) converter.

One example of such soft switching system DC-to-DC converters is a full-bridge switching power supply device (a zero-voltage-switching phase shift converter) disclosed in Japanese Unexamined Patent Application Publication No. 2000-232781. In the full-bridge switching power supply device, an on/off operation is performed alternately in each of two pairs of switching means to supply opposite direction current to the primary side of the transformer electrically connected between the pairs of switching means to supply current alternately to two output circuits implemented in the secondary side of the transformer.

If a DC-to-DC converter supplies large current from a single-output circuit, the load to the power semiconductor increases, hampering high-speed operation and causing adverse effects to efficiency and size. Specifically, embodiment for converters using transformers, energy conversion and energy accumulation occur in both the transformer and the coil (a reactor or an inductor) which smooths a pulsed voltage, leading to an inevitable increase in the size of a magnetic component including these elements. Also, since electric power is transmitted from the transformer to the coil in series, losses occurring in the transformer and the coil are affect conversion, causing suffered conversion efficiency.

SUMMARY

The present disclosure considers the foregoing situation and provides a DC voltage conversion circuit and a power supply device (a DC-to-DC converter) including the DC voltage conversion circuit that can meet increasing demands for miniaturization and high efficiency.

The present disclosure provides a direct-current (DC) voltage conversion circuit including: a first input terminal and a second input terminal; a plurality of switches; a series circuit part in which a primary side of a first transformer and a primary side of a second transformer are electrically connected in series. The first transformer and the secondary transformer have a same polarity and are magnetically independent. A first output circuit includes: a secondary side of the first transformer and a first rectifier diode electrically connected in series with the secondary side of the first transformer; a first output terminal at an edge in a rectification direction of the first rectifier diode; and a second output terminal at an edge opposite to the rectification direction of the first rectifier diode. A second output circuit includes a secondary side of the second transformer and a second rectifier diode electrically connected in series with the secondary side of the second transformer. The first output terminal is electrically connected to an edge in a rectification direction of the second rectifier diode, and the second output terminal is electrically connected to an edge opposite to the rectification direction of the second rectifier diode. A controller is configured to control the plurality of switches. The plurality of switches includes a first switch having one edge electrically connected to the first input terminal and a second switch having one edge electrically connected to the second input terminal. The first switch and the second switch are electrically connected in series, and one edge of the series circuit part is electrically connected between the first switch and the second switch. When a DC voltage is applied between the first input terminal and the second input terminal, the controller performs on/off control alternately having a dead-time period to the first switch and the second switch alternating a direction of current that flows in the series circuit part, and causing: a first state in which the first switch is turned on with current flowing in the rectification direction of the first rectifier diode in the first output circuit, accumulating electrical energy in the second transformer; and a second state in which the second switch is turned on with current flowing in the rectification direction of the second rectifier diode in the second output circuit, accumulating electrical energy in the first transformer, alternately. Permeability of a magnetic core in the first transformer and a permeability in a magnetic core of the second transformer is between 15 and 120.

In the above embodiment, current flows to only the first output circuit, and no current flows to the second output circuit due to the second rectifier diode, in the first state. However, since current flows to the primary side of the second transformer the second output circuit is associated, energy based on an inverse-electromotive force is accumulated in the second transformer. In the second state, current flows to only the first output circuit, and energy based on an inverse-electromotive force is accumulated in the first transformer. Thereby, since the permeabilities (the initial permeability) of the magnetic cores in the first transformer and the second transformer also operating as energy accumulation elements, are between 15 and 120, the magnetization of the transformers are less likely to saturate, and energy loss is reduced. Thus, it is possible to fulfill the aforementioned demands for miniaturization of DC voltage conversion circuits. In one embodiment, the permeability of the magnetic core of each transformer is between 26 and 60.

Another aspect of the present disclosure provides a power supply device including: the above-described DC voltage conversion circuit; and a direct-current power supply electrically connected to each of the first input terminal and the second input terminal included in the DC voltage conversion circuit.

DETAILED DESCRIPTION

Embodiments of the present disclosure will be described below with reference to the accompanying drawings.

First Embodiment

Figure 1:
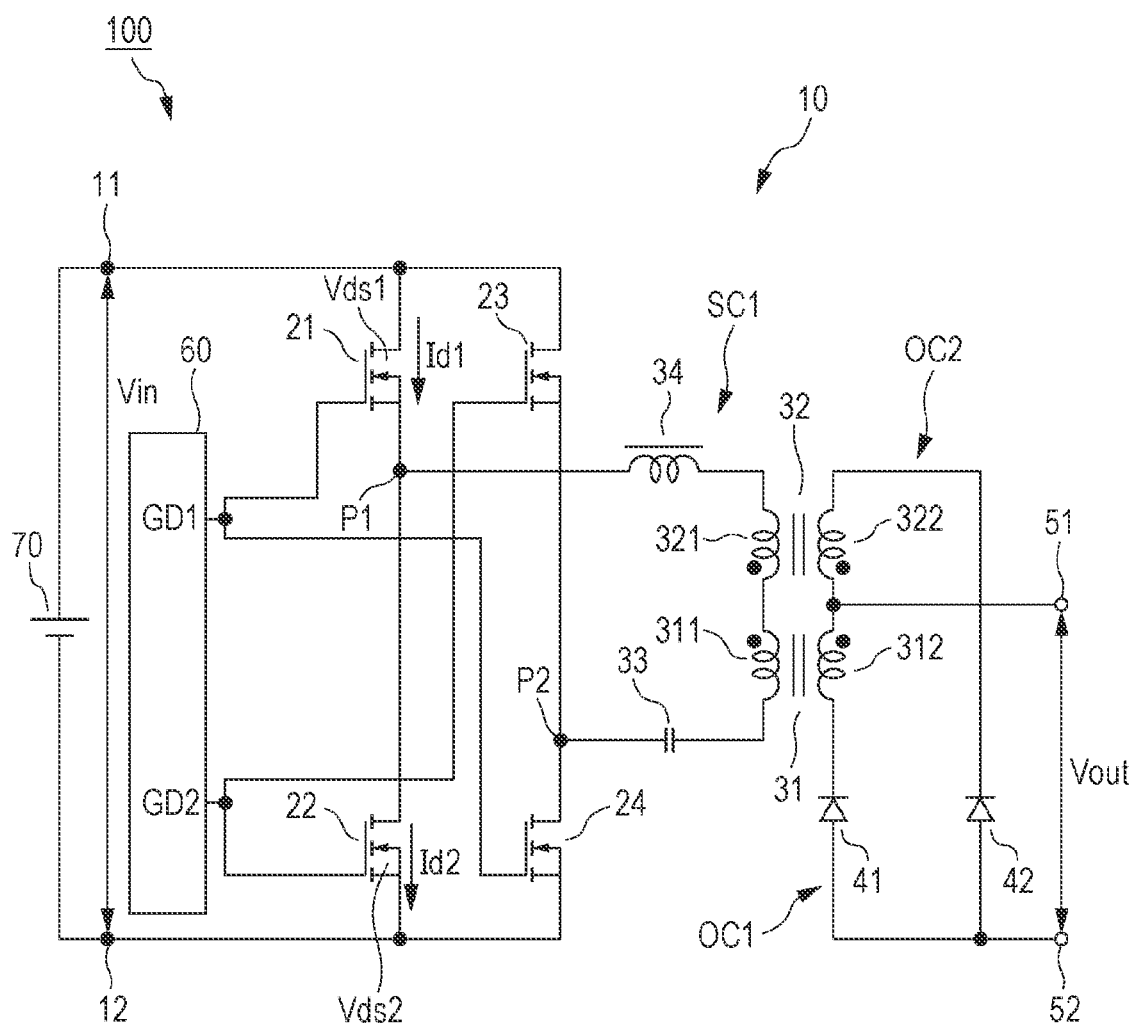
FIG. 1 is a circuit diagram of a power supply device according to a first embodiment.

FIG. 1 is a circuit diagram of a power supply device according to a first embodiment. As illustrated in FIG. 1, a power supply device 100 according to the first embodiment includes a DC voltage conversion circuit 10 and a DC power supply 70, which is electrically connected to both a first input terminal 11 and a second input terminal 12 included in the DC voltage conversion circuit 10. In FIG. 1, a positive terminal of the DC power supply 70 is electrically connected to the first input terminal 11, and a negative terminal of the DC power supply 70 is electrically connected to the second input terminal 12. The negative terminal of the DC power supply 70 may be electrically connected to a ground terminal, and the second input terminal 12 may be electrically connected to the ground.

The DC voltage conversion circuit 10 includes a plurality of switches. In one embodiment, the DC voltage conversion circuit 10 can include a first switch 21, a second switch 22, a third switch 23, and a fourth switch 24. Each of the switches 21 to 24 include a field-effect transistor. One edge of the first switch 21 and one edge of the third switch 23 are electrically connected in parallel with the first input terminal 11. One edge of the second switch 22 and one edge of the fourth switch 24 are electrically connected in parallel with the second input terminal 12. Another edge of the first switch 21 and another edge of the second switch 22 are electrically connected, forming a series connection (a half-bridge circuit). Another edge of the third switch 23 and another edge of the fourth switch 24 are electrically connected, forming a series connection (a half-bridge circuit).

Accordingly, the DC voltage conversion circuit 10 includes a full-bridge circuit. In the DC voltage conversion circuit 10, the series connection including the first switch 21 and the second switch 22 and the series connection including the third switch 23 and the fourth switch 24 are electrically connected in parallel between the first input terminal 11 and the second input terminal 12.

The DC voltage conversion circuit 10 further includes a series circuit part SC1 including a capacitor 33, a primary side 311 of a first transformer 31, and a primary side 321 of a second transformer 32 electrically connected in series. The first transformer 31 and the second transformer 32 have the same polarity. Also, the first transformer 31 and the second transformer 32 are magnetically independent. The capacitor 33 can be a DC blocking capacitor which can prevent large direct current from flowing to the series circuit part SC1 and the plurality of switches (the first to fourth switches 21 to 24). In the series circuit part SC1 of the DC voltage conversion circuit 10 illustrated in FIG. 1, a coil 34 is electrically connected in series with a series connection including the capacitor 33, the primary side 311 of the first transformer 31, and the primary side 321 of the second transformer 32.

One edge (a first edge P1) of the series circuit part SC1 is electrically connected between the first switch 21 and the second switch 22. The first switch 21 and the second switch 22 are electrically connected in series. Another edge (a second edge P2) of the series circuit part SC1 is electrically connected between the third switch 23 and the fourth switch 24. The third switch 23 and the fourth switch 24 are electrically connected in series.

The DC voltage conversion circuit 10 further includes a first output circuit OC1. The first output circuit OC1 includes a secondary side 312 of the first transformer 31 and a first rectifier diode 41 electrically connected in series. The first output circuit OC1 also has a first output terminal 51 at an edge in a rectification direction of the first rectifier diode 41 (cathode of the first rectifier diode 41). An output voltage Vout of the first output circuit OC1 is a potential difference of the first output terminal 51 with respect to a second output terminal 52. The output terminal 52 is corresponds to an edge connected electrically opposite to the rectification direction of the first rectifier diode 41 (anode of the first rectifier diode 41). The second output terminal 52 may be a ground terminal.

The DC voltage conversion circuit 10 further includes a second output circuit OC2. The second output circuit OC2 includes a secondary side 322 of the second transformer 32 and a second rectifier diode 42 electrically connected in series. The first output terminal 51 is electrically connected to an edge in a rectification direction of the second rectifier diode 42 (cathode of the second rectifier diode 42). An edge electrically connected opposite to the rectification direction of the second rectifier diode 42 (anode of the second rectifier diode 42) is electrically connected to the second output terminal 52.

Accordingly, the first output circuit OC1 and the second output circuit OC2 share output terminals (the first output terminal 51 and the second output terminal 52). Also, in the DC voltage conversion circuit 10, the secondary side 312 of the first transformer 31 and the secondary side 322 of the second transformer 32 are electrically connected in series. Thus, a potential difference between the secondary side 312 of the first transformer 31 and the secondary side 322 of the second transformer 32 is provided from the first output terminal 51.

The DC voltage conversion circuit 10 further includes a controller 60 configured to controls the plurality of switches (the first to fourth switches 21 to 24). The controller 60 includes two pulse-drive circuits (a first gate drive GD1 and a second gate drive GD2). The first gate drive GD1 and the second gate drive GD2 are configured to output on/off signals independently. The first gate drive GD1 can control the first switch 21 and the fourth switch 24 synchronously, and the second gate drive GD2 can control the second switch 22 and the third switch 23 synchronously.

Figure 2:
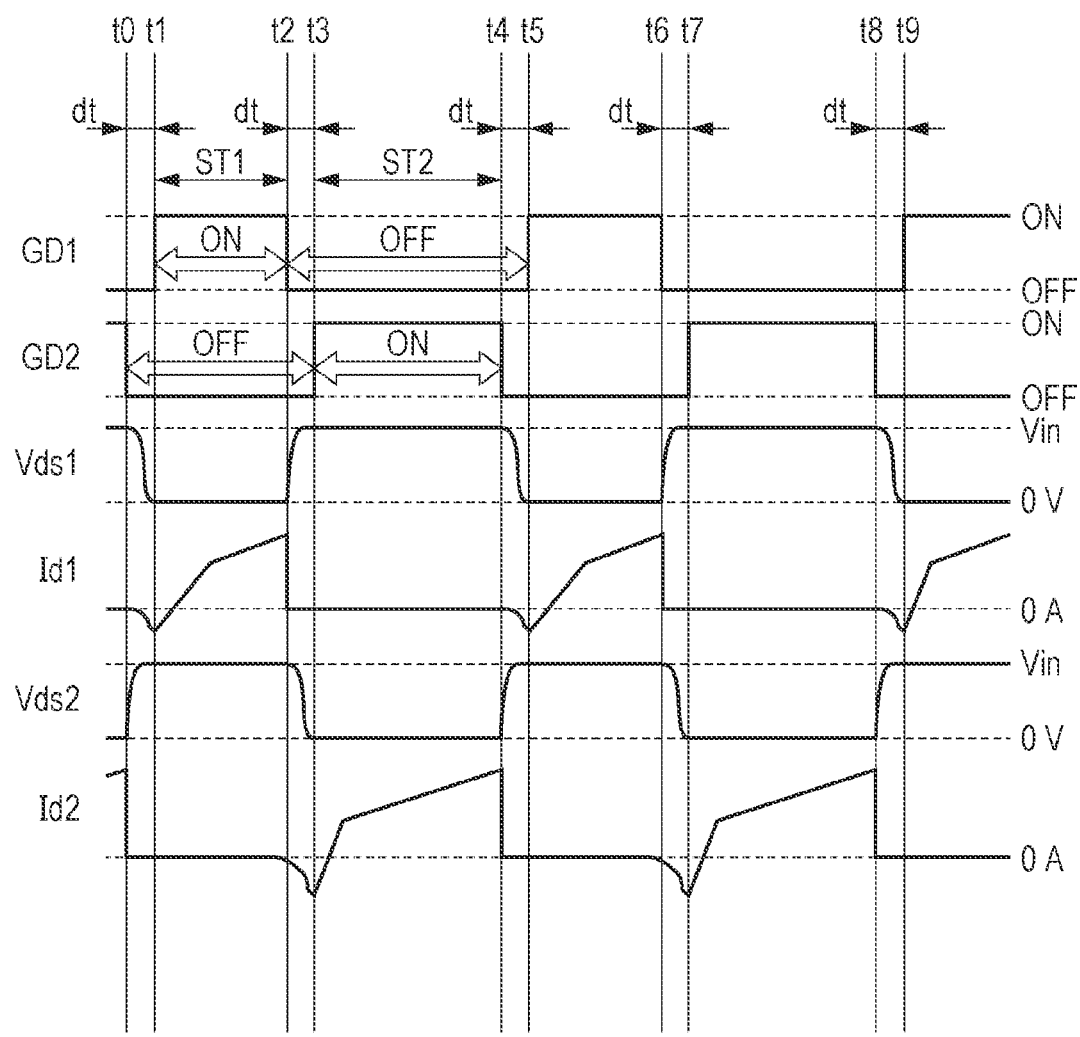
FIG. 2 is a timing chart of the circuit illustrated in FIG. 1.

FIG. 2 is a timing chart of the circuit illustrated in FIG. 1. As illustrated in FIG. 2, the controller 60 performs on/off control alternately with a dead-time period dt to the first switch 21 and the second switch 22. The control process will be described below in detail with reference to FIG. 2. The controller 60 controls the first switch 21 (and the fourth switch 24 can be controlled synchronously). The first gate drive GD1 is OFF between time t0 and time t1, is ON between time t1 and time t2, and is OFF between time t2 and time t5. Similarly, the first gate drive GD1 is ON between time t5 and time t6, is OFF between time t6 and time t9, and is ON in time t9 and beyond. The controller 60 controls the second switch 22 (and the third switch 23 can be controlled synchronously).

The second gate drive GD2 is OFF between time t0 and time t3 and is ON between time t3 and time t4. Similarly, the second gate drive GD2 is OFF between time t4 and time t7, is ON between time t7 and time t8, and is OFF in time t8 and beyond. Thus, the dead-time period dt corresponds to the duration between time t0 and time t1, the duration between time t2 and time t3, the duration between time t4 and time t5, the duration between time t6 and time t7, and the duration between time t8 and time t9.

When the first gate drive GD1 is turned on at time t1 after time t0, the drain voltage Vds1 in the first switch 21 decreases, thereby changing the first switch 21 to an electrically conductive state. Thus, the drain current Id1 of the first switch 21 increases over time. The fourth switch 24 is also driven by the first gate drive GD1. Thus, the drain voltage and the drain current of the fourth switch 24 behaves similarly to the drain voltage Vds1 and the drain current Id1 of the first switch 21.

Figure 3:
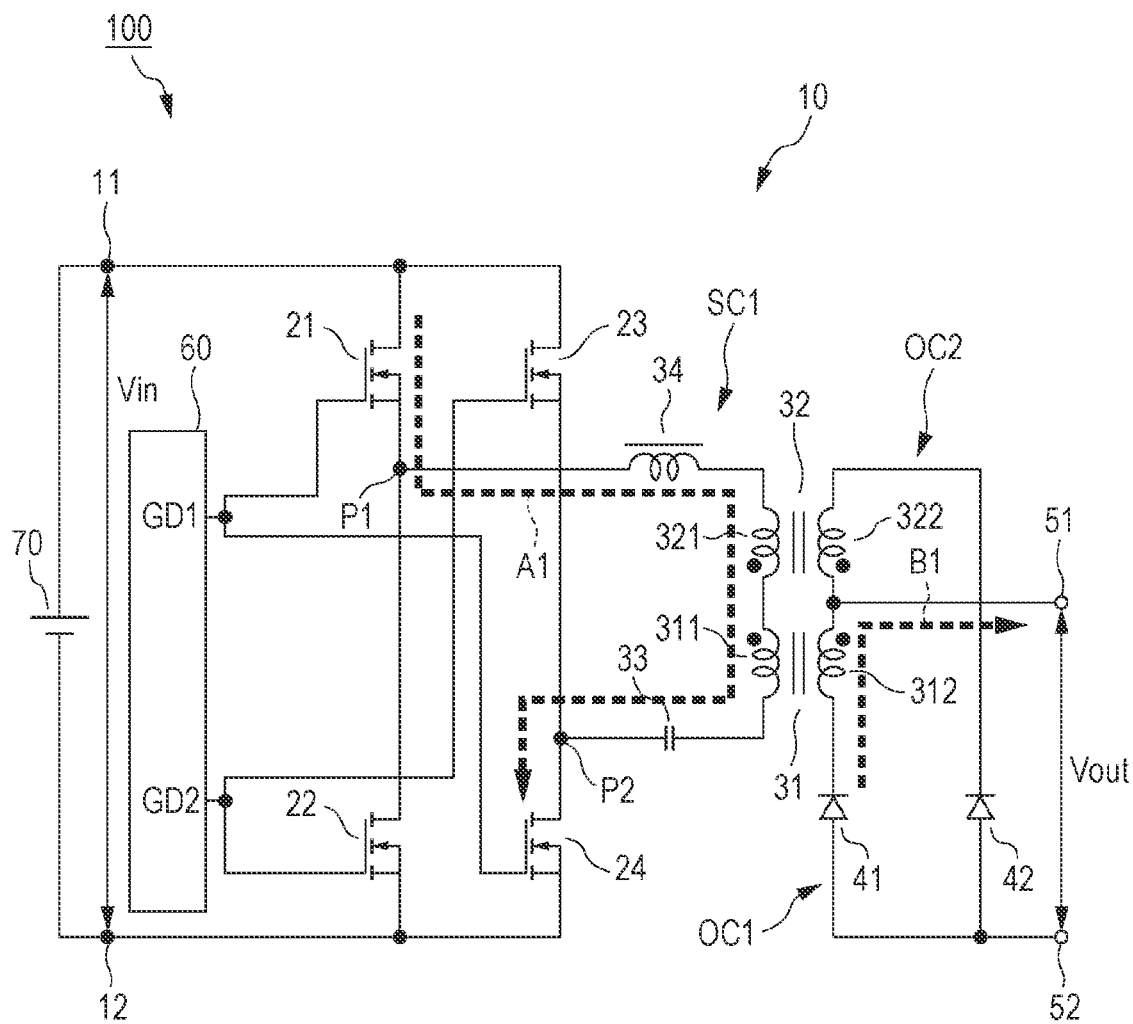
FIG. 3 is a diagram illustrating an operation when the circuit illustrated in FIG. 1 is in a first state (if a first gate drive is ON and a second gate drive is OFF)

Accordingly, in a period from time t1 to time t2, current flows from the first edge P1 to the second edge P2 in the series circuit part SC1, as indicated by an arrow A1 with a dashed-line in FIG. 3. FIG. 3 is a diagram illustrating the operation when the circuit illustrated in FIG. 1 is in a first state ST1 (when the first gate drive GD1 is in ON operation and the second gate drive GD2 is in OFF operation).

The current flowing in the series circuit part SC1 generates inverse-electromotive forces at the primary side 311 of the first transformer 31 and the primary side 321 of the second transformer 32. At the secondary side 312 of the first transformer 31, induced current flows in the first output circuit OC1 (as indicated an arrow B1 with a dashed-line in FIG. 3) due to an electromotive force induced by the inverse-electromotive forces. However, since the second output circuit OC2 has the second rectifier diode 42 that passes current from the second output terminal 52 to only the first output terminal 51, no induced current flows in the second output circuit OC2 including the secondary side 322 of the second transformer 32. Since the first transformer 31 and the second transformer 32 are magnetically independent, energy due to the inverse-electromotive force is accumulated in the second transformer 32.

Thereafter, in time t2, the first gate drive GD1 changes from the ON state to the OFF state, and during the dead-time period dt between time t2 and time t3, the drain voltage Vds1 increases, and the first switch 21 enters a non-conductive state. Thus, the drain current Id1 of the first switch 21 which has been increasing since time t1 drops to 0 A at time t2.

Since the second gate drive GD2 is turned off at time t0,ti the drain voltage Vds2 of the second switch 22 increases during the dead-time period dt between time t0 and time t1, and the second switch 22 enters a non-conductive state. Thus, drain current Id2 of the second switch 22 which has been increasing since time t0 drops to 0 A at time t0. At time t2, the second gate drive GD2 is still in the OFF state, whereas the first gate drive GD1 changes from the ON state to the OFF state, so that the dead-time period dt between time t2 and time t3 starts. At this timing, a resonance circuit that includes output capacitances of the first switch 21 and the third switch 23 (drain-source capacitances of the field-effect transistors) and the inductance elements (the coil 34 and the second transformer 32) are formed. Fluctuations of voltage due to resonance in the resonance circuit are superimposed to the drain voltage Vds2 of the second switch 22 during the dead-time period dt between time t2 and time t3, enabling zero voltage switching. Also, since current due to the resonance circuit is superimposed on the drain current Id2 of the second switch 22, the drain current Id2 temporarily becomes negative current. Details of this situation are described later.

Figure 4:
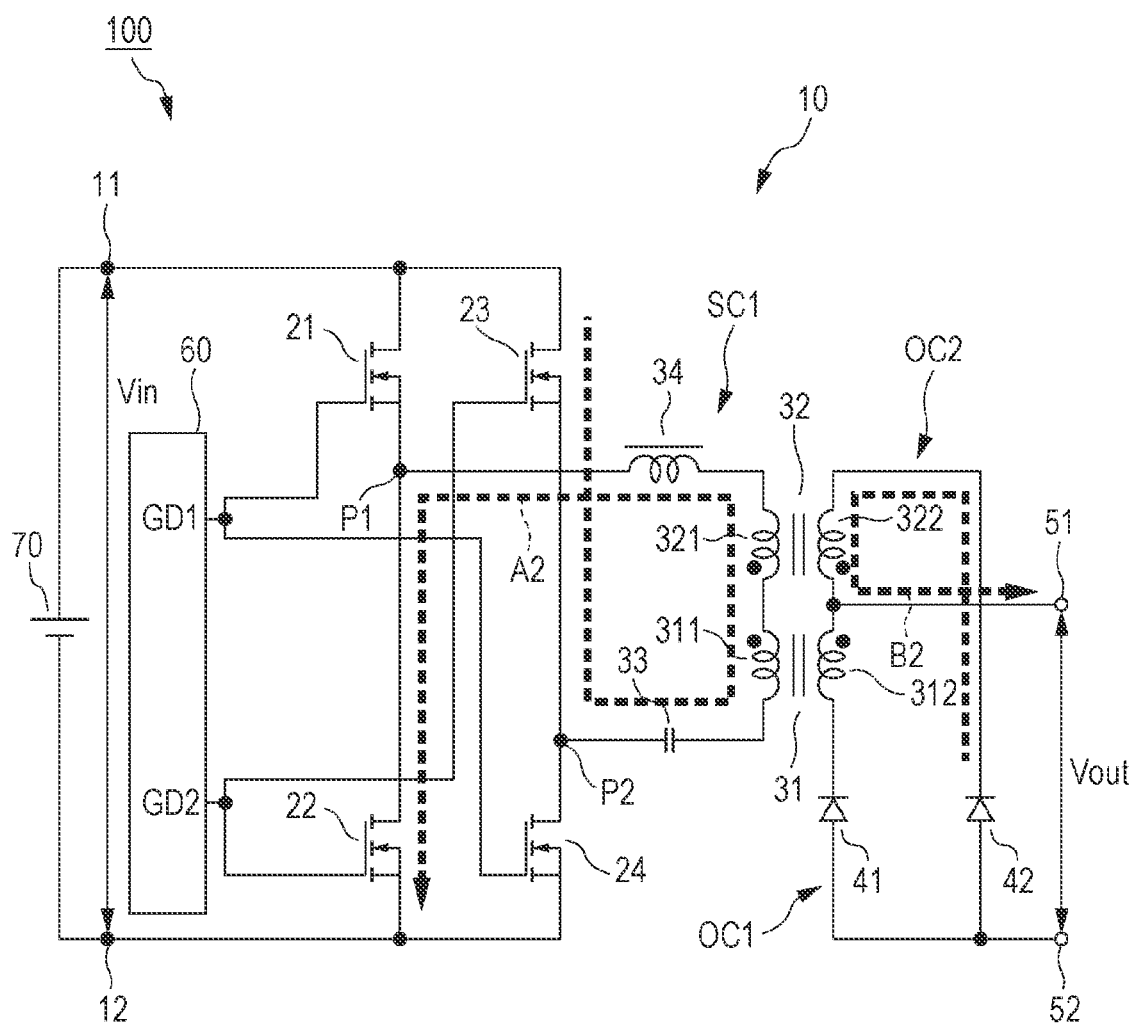
FIG. 4 is a diagram illustrating an operation when the circuit illustrated in FIG. 1 is in a second state (if the second gate drive is ON and the first gate drive is OFF)

If the second gate drive GD2 is turned on at time t3, effects from resonance due to charges accumulated in the output capacitances of the first switch 21 and the third switch 23 are reduced, thus the drain voltage Vds2 of the second switch 22 decreases steadily, and the second switch 22 enters to an electrically conductive state. Thus, the drain current Id2 of the second switch 22 increases over time. The third switch 23 also operates according to the second gate drive GD2. Thus, the drain voltage and the drain current of the third switch 23 behaves similarly to the drain voltage Vds2 and the drain current Id2 of the second switch 22. Accordingly, between time t3 and time t4, current flows in the series circuit part SC1 from the second edge P2 to the first edge P1, as denoted by an arrow A2 with a dashed-line, as illustrated in FIG. 4. FIG. 4 is a diagram illustrating an operation when the circuit illustrated in FIG. 1 is in a second state ST2 (when the second gate drive GD2 is in ON operation and the first gate drive GD1 is in OFF operation).

The current that flows in the series circuit part SC1 also generates inverse-electromotive forces at the primary side 311 of the first transformer 31 and the primary side 321 of the second transformer 32. At the secondary side 322 of the second transformer 32, induced current flows in the second output circuit OC2 (as indicated by an arrow B2 with a dashed-line in FIG. 4) due to the electromotive force induced by the inverse-electromotive forces. However, since the first output circuit OC1 includes a first rectifier diode 41 that passes current from the second output terminal 52 to only the first output terminal 51, no induced current flows in the first output circuit OC1 including the secondary side 312 of the first transformer 31. Since the first transformer 31 and the second transformer 32 are magnetically independent, energy based on the inverse-electromotive force is accumulated in the first transformer 31.

In the DC voltage conversion circuit 10 according to the first embodiment, if a DC voltage is applied between the first input terminal 11 and the second input terminal 12, the controller 60 performs on/off control alternately with the dead-time period dt to the first switch 21 and the second switch 22, as described above. Thereby, the direction of current that flows in the series circuit part SC1 is reversed alternately. The first state ST1 and the second state ST2 are caused alternately due to the controller 60. During the first state ST1, the first switch 21 and the fourth switch 24 are in ON state. Thus, during the first state ST1, current flows in the first output circuit OC1 in the rectification direction of the first rectifier diode 41 (as indicated by the arrow B1 with a dashed-line), and electrical energy is accumulated in the second transformer 32. During the second state ST2, the second switch 22 and the third switch 23 are in ON state. Thus, during the second state ST2, current flows in the second output circuit OC2 in the rectification direction of the second rectifier diode 42 (as indicated by the arrow B2 with a dashed-line in FIG. 4), and electrical energy is accumulated in the first transformer 31. In the DC voltage conversion circuit 10 according to the first embodiment, all the periods when the first switch 21 and the fourth switch 24 are in ON state belongs to the first state ST1. Also, all the periods when the second switch 22 and the third switch 23 are in ON state belongs to the second state ST2, as illustrated in FIG. 2.

In the DC voltage conversion circuit 10 according to the first embodiment, the controller 60 can change the potential difference (the output voltage Vout) of the first output terminal 51 with respect to the second output terminal 52 by changing at least either the duty ratio D1 of the first switch 21 or the duty ratio D2 of the second switch 22. The duty ratio D1 of the first switch 21 and the duty ratio D2 of the second switch 22 can satisfy the following condition:

$0<D1<1$, $0<D2<1$, $D1 \neq D2$, and $0<D1+D2<1$.

Since $D1 \neq D2$ holds, the amount of current that flows to the direction indicated by the arrow A1 with a dashed-line in the first state ST1 and the amount of current that flows in the direction indicated by the arrow A2 with a dashed-line in the second state ST2 do not match (asymmetric). Thus, the capacitor 33, which is a DC blocking capacitor, is included in the series circuit part SC1 so that DC components of current that flows in the series circuit part SC1 are not generated. Thus, large current does not flow in the series circuit part SC1 from the first edge P1 to the second edge P2 (for D1>D2), as indicated by the arrow A1 with a dashed-line, or in the direction from the second edge P2 to the first edge P1 (for D1<D2), as indicated by the arrow A2 with a dashed-line.

In this embodiment, if the dead-time period dt after the period when the first switch 21 and the fourth switch 24 are in ON state is sufficiently longer than the period when the first switch 21 and the fourth switch 24 are in ON state. Also, the dead-time period dt after the period when the second switch 22 and the third switch 23 are in ON state is sufficiently shorter than the period when the second switch 22 and the third switch 23 are in ON state. Therefore, the following relation can be satisfied.

$D1+D2 \approx 1$

In this embodiment, the output voltage Vout satisfies the following relation:

$Vout \propto D1(1-D1)$.

According to the above relation, the output voltage Vout and the duty ratio D1 of the first switch 21 has a relationship corresponding to a parabola that intersects Vout=0 at D1=0 and D1=1, with the parabola having a vertex at D1=0.5. Therefore, in one embodiment, the output voltage Vout can be adjusted so that D1 is in the range of 0<D1<0.5 or 0.5<D1<1.

Figure 5A:
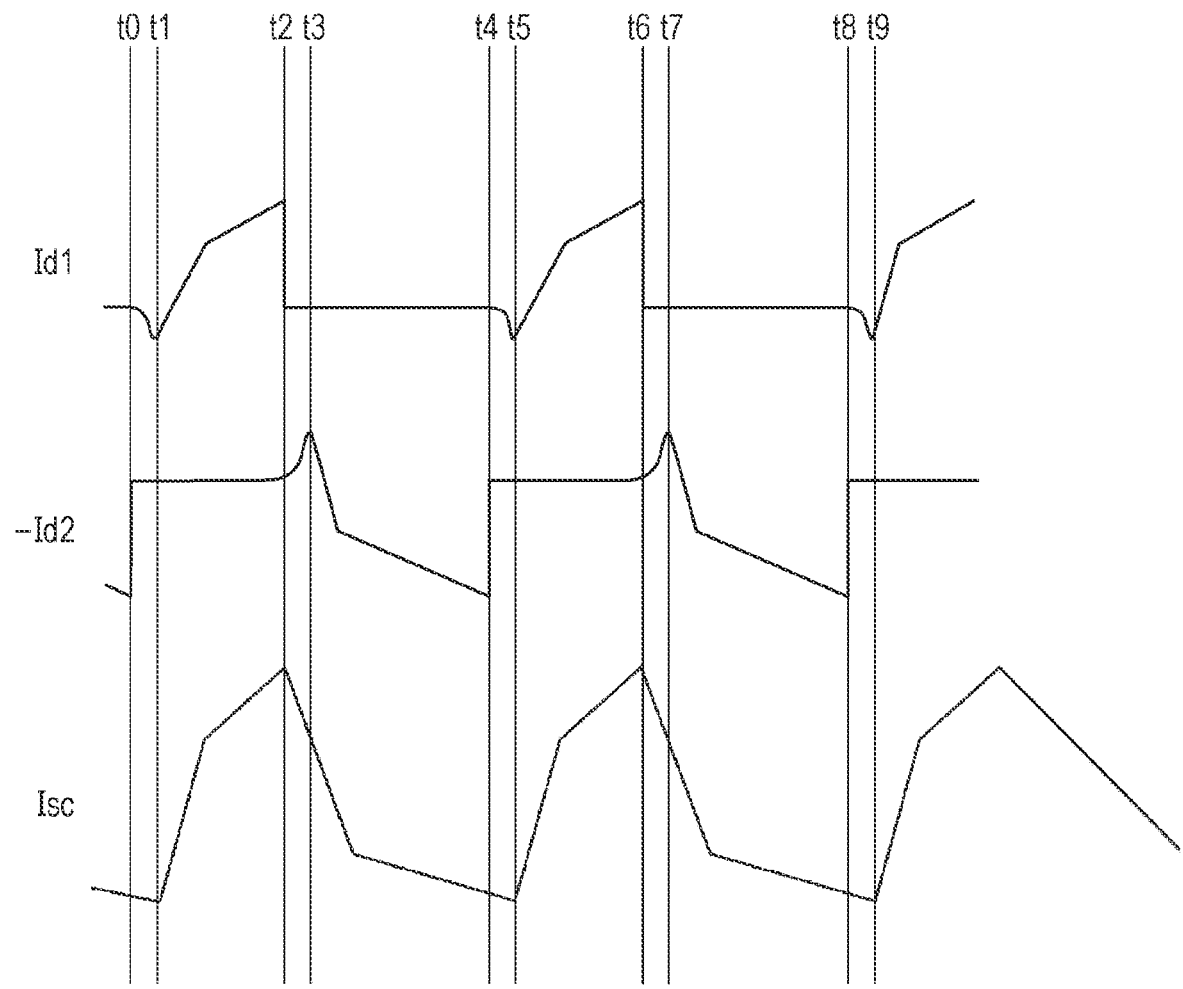
FIG. 5A is a timing chart of current that flows in the series circuit part in the circuit illustrated in FIG. 1.
Figure 5B:
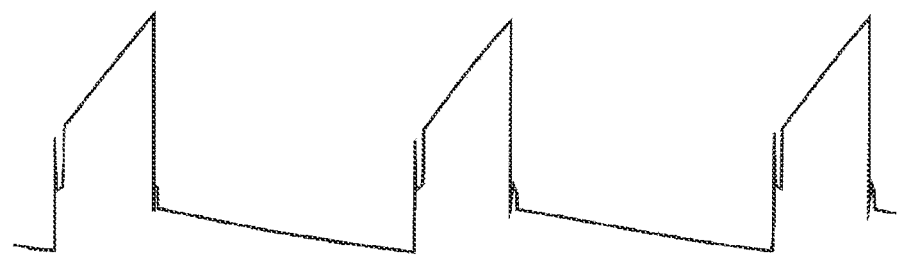
FIG. 5B is a timing chart of current that flows in the series circuit part when a resonance circuit included in the circuit illustrated in FIG. 1 does not operate according to the intended design.

FIG. 5A is a timing chart illustrating the current which flows in the series circuit part in the circuit illustrated in FIG. 1. FIG. 5B is a timing chart illustrating the current that flows in the series circuit part when the resonance circuit included in the circuit illustrated in FIG. 1 is not operating according to the intended design. The chart in the top side of FIG. 5A depicts the drain current Id1 of the first switch 21 illustrated in FIG. 2. The middle current chart in FIG. 5A can be obtained by inverting the polarity of the drain current Id2 of the second switch 22 illustrated in FIG. 2.

These currents flow in the series circuit part SC1. When the current flowing from the first edge P1 to the second edge P2 is assumed to positive, a current chart obtained by combining the top-side current chart in FIG. 5A and the middle current chart in FIG. 5A is a chart of combining the current Isc that flows in the series circuit part SC1. This chart of the combined current Isc is illustrated in the lower side of FIG. 5A. Referring to the lower-side chart of FIG. 5A, the combined current Isc fluctuates gradually due to the inductive elements (the coil 34, the first transformer 31, and the second transformer 32) included in the series circuit part SC1.

When the inductive elements (the coil 34, the first transformer 31, and the second transformer 32) included in the series circuit part SC1 do not operate according to the intended design, the combined current Isc changes rapidly in response to the operations of the first gate drive GD1 and the second gate drive GD2, as illustrated in FIG. 5B.

Figure 6A:
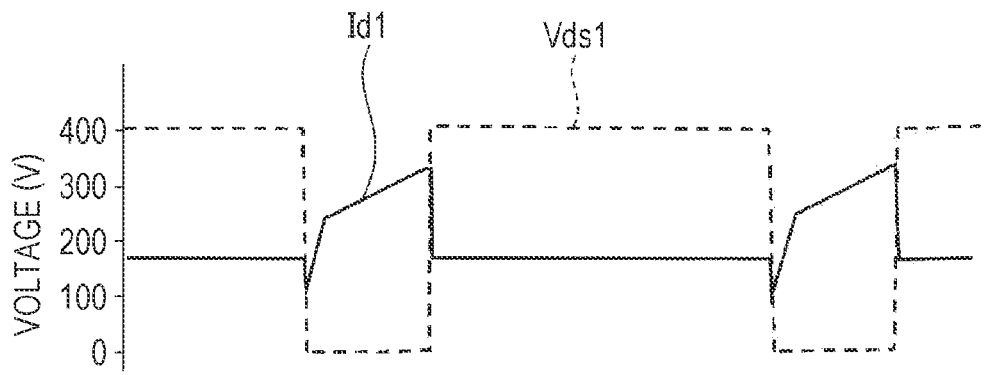
FIG. 6A is a timing chart when the resonance circuit included in the circuit illustrated in FIG. 1 operates according to the intended design.
Figure 6B:
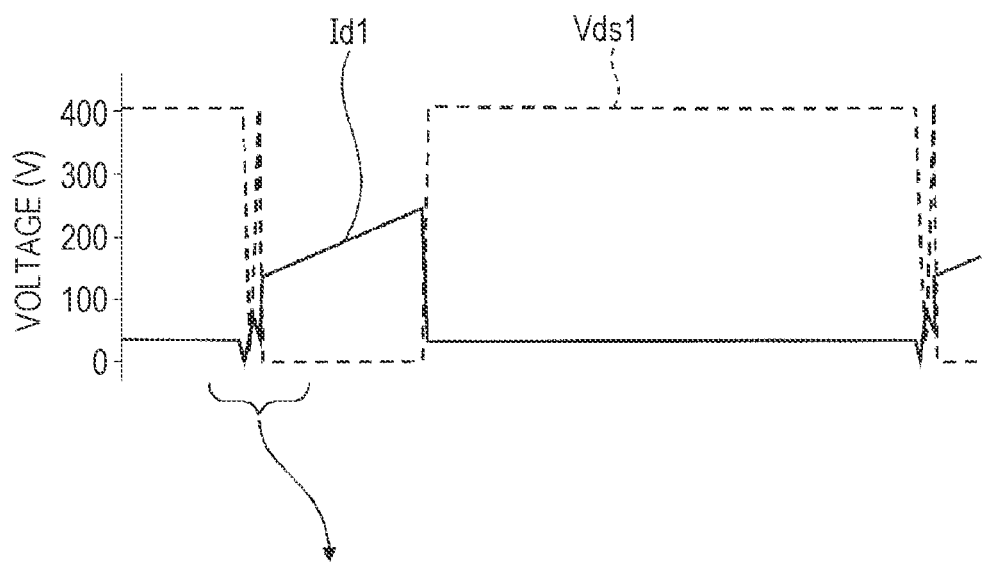
FIG. 6B is a timing chart when the resonance circuit included in the circuit illustrated in FIG. 1 does not operate according to the intended design.
Figure 6C:
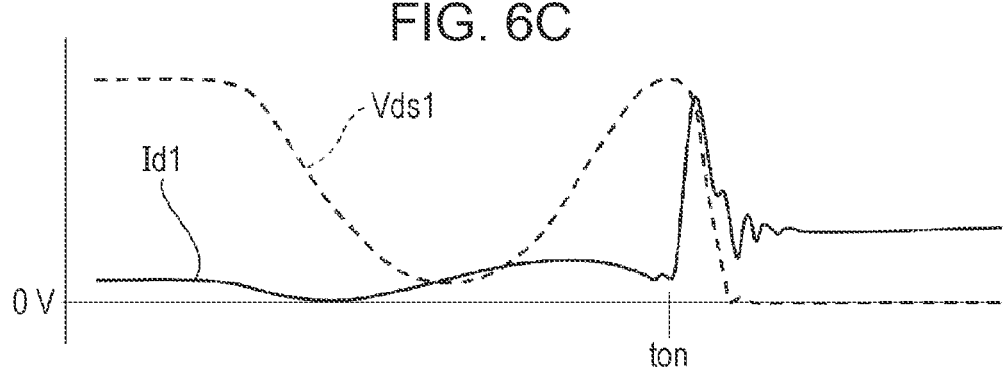
FIG. 6C is an enlarged timing chart of a part of FIG. 6B.

FIG. 6A is a timing chart illustrating an embodiment when the resonance circuit included in the circuit illustrated in FIG. 1 operates according to the intended design. FIG. 6B is a timing chart illustrating an embodiment when the resonance circuit included in the circuit illustrated in FIG. 1 does not operate according to the intended design. FIG. 6C is an enlarged timing chart corresponding to a part of FIG. 6B.

When the inductive elements in the resonance circuit operate according to the intended design, as when a self-inductance Lr of the coil 34 in the series circuit part SC1 in the DC voltage conversion circuit 10 is sufficiently large, the drain voltage Vds1 of the first switch 21 reaches 0 V or lower, and the drain current Id1 flows in the negative direction, as illustrated in FIG. 6A, thereby achieving zero voltage switching. The first transformer 31 or the second transformer 32 may be a part of the resonance circuit.

In contrast, when the inductive elements in the resonance circuit do not operate according to the intended design (specifically, for example, when the self-inductance Lr of the coil 34 is too small, or when the coil 34 is not provided in the series circuit part SC1), the impedance of the series circuit part SC1 increases, as illustrated in FIG. 6B and FIG. 6C. Then, the amount of current that flows to the capacitors (specifically, the output capacitances of the first switch 21 and the fourth switch 24) in the resonance circuit decreases. Thus, the maximum value of the amplitude of a voltage (a maximum amplitude voltage) generated by the resonance circuit decreases, and the drain voltage Vds1 of the first switch 21 does not drop to 0 V.

Also, since the inductance of the series circuit part SC1 is low, the time constant τ decreases. In the example illustrated in FIG. 6C, the timing "ton" when the field-effect transistor included in the first switch 21 starts the ON operation is delayed with respect to the time constant τ. Thus, zero voltage switching does not occur. Also, a spike-like voltage increase (a surge voltage) occurs in the drain voltage Vds1 of the first switch 21, and this voltage increase may cause noise.

As described above, to have the switches, such as the first switch 21, to operate as intended, the inductances of the inductive elements in the resonance circuit be set to a relatively large value. Therefore, the coil 34 can be included in the circuit. In the DC voltage conversion circuit 10 according to the present embodiment, the first transformer 31 and the second transformer 32 are magnetically independent. Thus, when current flows into the output circuit (the first output circuit OC1) either of the transformers 31 and 32 is associated, no current flows to the output circuit (the second output circuit OC2) the other transformer (the second transformer 32) is associated. Thus, the primary side (the primary side 321) of the other transformer (the second transformer 32) can operate as an inductor, as it is the case for the coil 34.

If the DC voltage conversion circuit 10 is applied to, a power supply device for information processing devices or a display devices (liquid-crystal displays or organic electroluminescence displays), for example, noise needs to be inhibited. Thus, zero voltage switching can be performed, as illustrated in FIG. 6A. If the DC voltage conversion circuit 10 is applied to devices impact of noise are relatively limited, for example, power supply devices in a charging stand for electric vehicles, zero voltage switching is not always required. In this embodiment, for example, when the charge accumulated in the output capacitances of the switches is released, a spike voltage (a surge voltage) or a spike current (a surge current) can occur (hard switching), as illustrated in FIG. 6B and FIG. 6C. However, it is not always necessary to modify resonance conditions to increase the maximum amplitude voltage at the resonance circuit (in which the first transformer 31 or the second transformer 32 functions as an inductor) in the DC voltage conversion circuit 10. Therefore, it is possible to have a wide controllable range in the DC voltage conversion circuit 10. Additionally, since the DC voltage conversion circuit 10 does not necessarily have to include the coil 34, it is possible to miniaturize the DC voltage conversion circuit 10.

Since the DC voltage conversion circuit 10 described above uses a full-bridge circuit, the voltage applied to the series circuit part SC1 is an input voltage Vin from the DC power supply 70 in the power supply device 100. Thus, in one embodiment, the DC voltage conversion circuit 10 can be used for high-power output converters. Using a duty ratio D1 (0<D1<1) of pulses output from the pulse-drive circuit and the turn ratio (the ratio between the number of turns in the primary-side and the number of turns in the secondary-side) n of the transformers (where the turn ratio of the first transformer 31 and the turn ratio of the second transformer 32 are equal to each other), the relationship between the output voltage Vout and the input voltage Vin of the DC voltage conversion circuit 10 can be formulized as, Vout=2×D1×(1−D1)×Vin/n.

Accordingly, although the DC voltage conversion circuit 10 according to the present embodiment does not necessarily have a high step-down ratio (Vout/Vin) for a DC-to-DC converter, the amount of current that flows to the switches, including the first switch 21, is relatively small. Thus, the DC voltage conversion circuit 10 is suitable for high-power output applications.

However, if ferrite soft magnetic materials are used for a high frequency (e.g., 100 kHz or more) applications in magnetic cores of the inductive elements (the coil 34, the first transformer 31, and the second transformer 32) to reduce core loss, the following problem can occur. In the DC voltage conversion circuit 10 described above, each transformer whose secondary side is electrically connected to the output circuit where no current flows operates as an energy accumulation element, as it is the case for the coil 34. From efficient accumulation of energy, the magnetic cores of the transformers can be made from materials that are less likely to saturate magnetically. However, since ferrite soft magnetic materials have relatively high permeabilities, an air gap part can be provided in the magnetic core of each transformer to reduce the effective permeability. The air gap part, however, causes leakage-flux, leading to an increase in loss (including copper loss) within the magnetic core of the transformer. Also, since ferrite soft magnetic materials have a relatively low saturation magnetic flux density, the volume of the magnetic core of each transformer can to be increased to avoid magnetic saturation, which is a limiting factor for miniaturizing the transformer.

Figure 7:
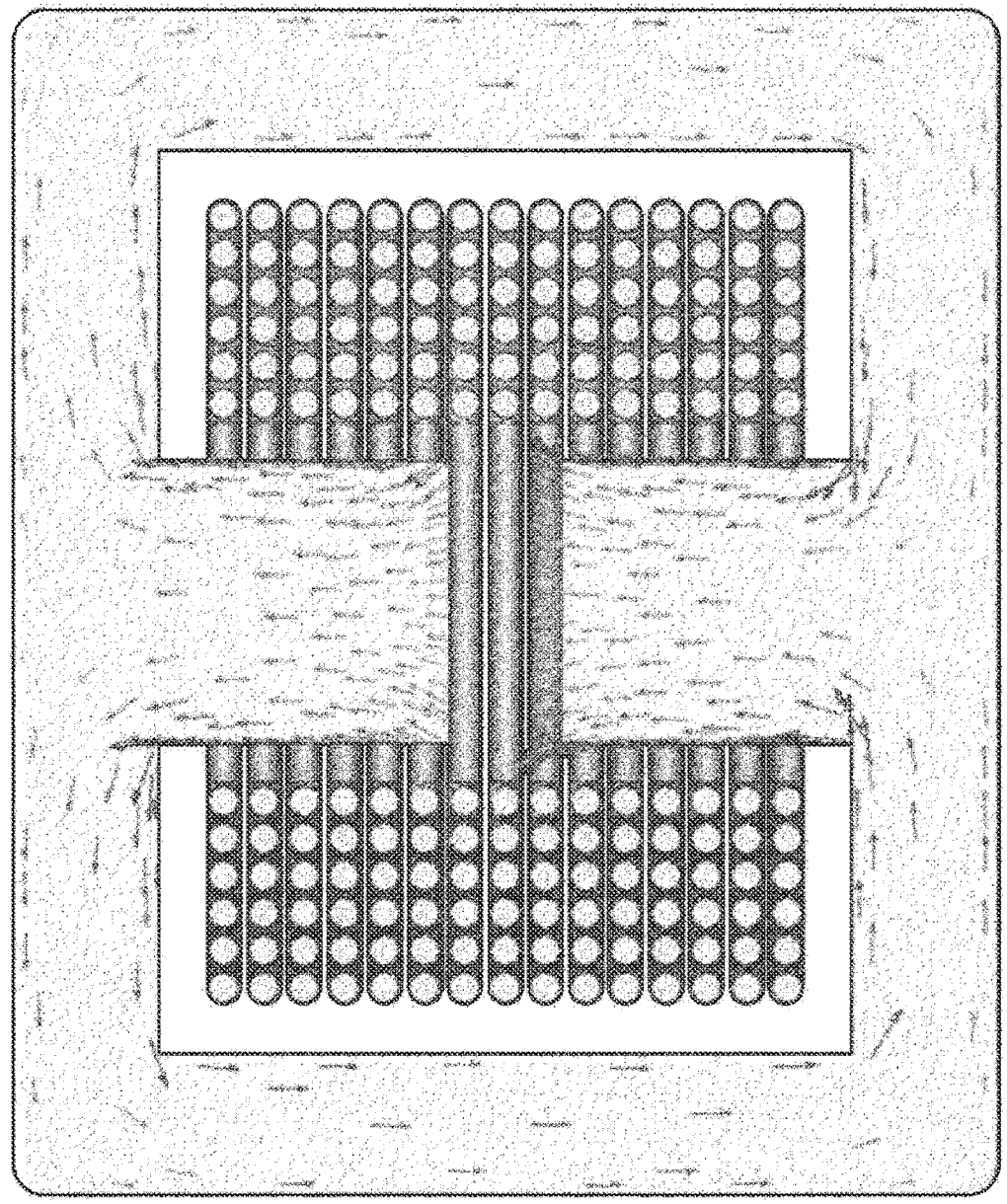
FIG. 7 illustrates a result of simulation of a magnetic flux density of a leakage magnetic field generated when current flows through a coil with a magnetic core having an air gap.
Figure 8:
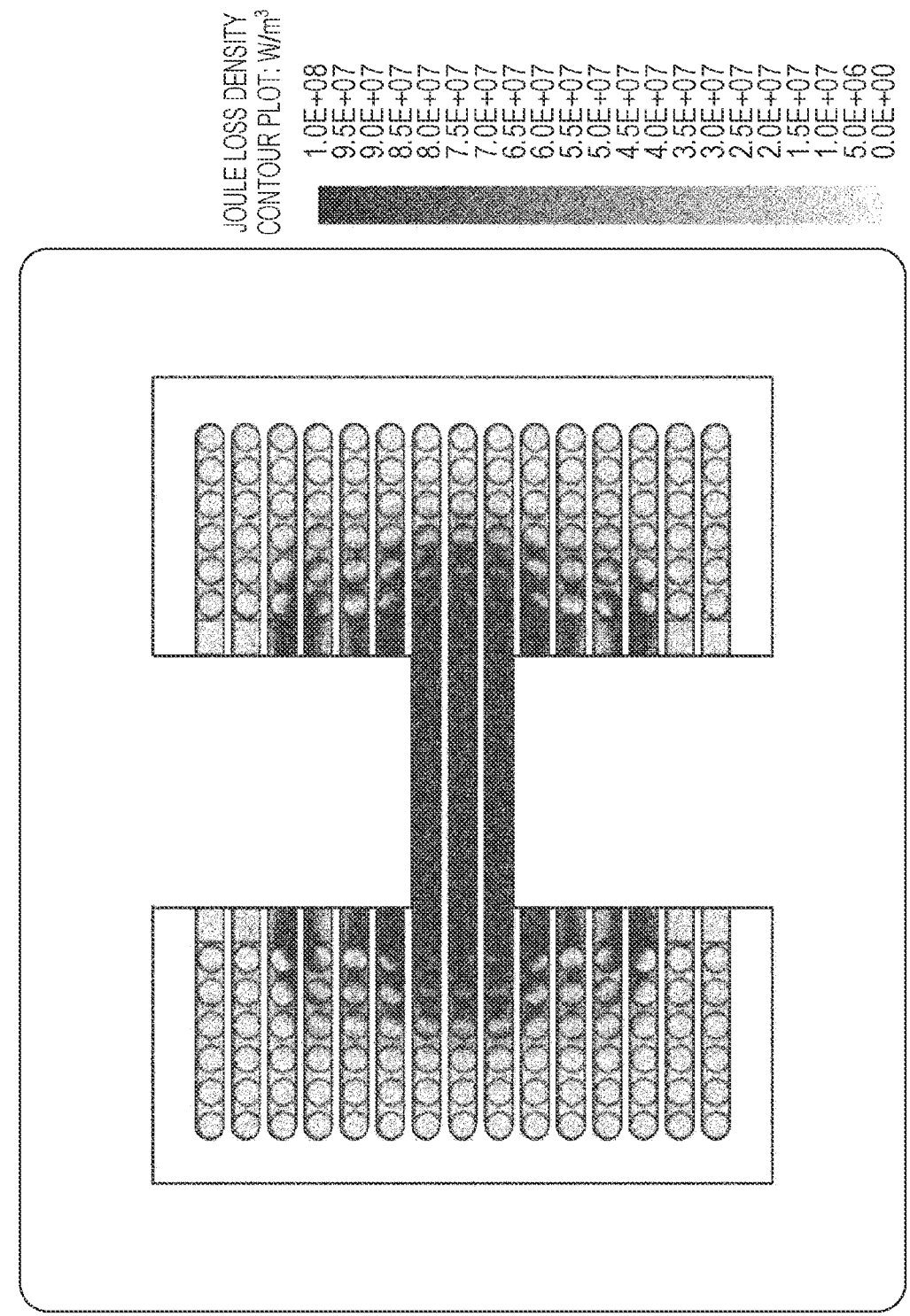
FIG. 8 illustrates a result of simulation of Joule loss density based on leakage magnetic field for the coil illustrated in FIG. 7.

FIG. 7 illustrates the simulation result of magnetic flux (leakage flux) for a leakage magnetic field that occurs when current is flowing through a coil whose magnetic core has an air gap part. FIG. 8 illustrates a simulation result of Joule loss density based on the leakage flux. When the magnetic core has an air gap part, magnetic flux leaks from the air gap part, as indicated by arrows in FIG. 7. Also, part of the leakage flux passes through the coil located in the vicinity of the air gap. The leakage flux from the air gap part causes induced current to flow in the coil, causing Joule losses. Since the Joule loss density becomes high within the vicinity of the air gap part, as illustrated in FIG. 8, the size of a coil whose magnetic core has an air gap part can be determined considering the heat generated due to the Joule losses, preventing the characteristics of the coil from suffering.

Accordingly, in the DC voltage conversion circuit 10 according to the first embodiment, the permeability (the initial permeability) of the magnetic core for each of the transformers (the first transformer 31 and the second transformer 32) can be set to values between 15 and 120. Then, the magnetization of the transformer is less likely to saturate, and energy loss is less likely to occur even without an air gap part in the transformer. In one embodiment, the permeability of the magnetic core of each transformer can be set to values between 20 and 80. In another embodiment, the permeability of the magnetic core of each transformer can be set to values between 25 and 60. MnZn-based ferrite is one example of the soft magnetic material which can be used as the magnetic core of each transformer. MnZn-based ferrite has a permeability between 1000 and 3500, for example. If the aforementioned material is used and the permeability (the effective magnetic permeability) of the magnetic core of each transformer is set to values within the aforementioned range, an air gap part can be provided, considering factors such as the leakage flux described above. In one embodiment, the cores in at least either of the transformers (the first transformer 31 and the second transformer 32) included in the DC voltage conversion circuit 10 can be gapless.

Also, in the DC voltage conversion circuit 10 according to the first embodiment, the saturation magnetic flux density of the magnetic core of each of the transformers (the first transformer 31 and the second transformer 32) can be 700 mT or greater, to reduce the possibility of magnetic saturation occurring in the magnetic cores of the transformers. In one embodiment, the saturation magnetic flux density of the magnetic core of the transformer can be 0.9 T or greater. In another embodiment, the saturation magnetic flux density can be 1.1 T or greater. If magnetic saturation in the magnetic cores of the transformers need to be prevented, the saturation magnetic flux density of the magnetic cores of the transformers can be set to high values. If efficiency suffers when using a magnetic material having a saturation magnetic flux density or 1.4 T or greater, the upper limit of the saturation magnetic flux density can be set to 1.3 T in some embodiments. In one embodiment, the saturation magnetic flux density of the magnetic core of each transformer can be set to values between 0.8 and 1.3 T to have both increased saturation magnetic flux density and reduction of energy loss. In another embodiment, the saturation magnetic flux density can be set to values equal to 1.2 T or lower so that materials which are available in the market can be used for the magnetic cores of transformers. The saturation magnetic flux density of ferrite soft magnetic material, which is one example of the soft magnetic material that constitutes the magnetic core of the transformer can be between 380 and 500 mT.

To achieve values of permeability and values of the saturation magnetic flux density described above, the magnetic material used for the magnetic core of each of the transformers (the first transformer 31 and the second transformer 32) can contain amorphous metal soft magnetic material, nanocrystalline metal soft magnetic material, or the like. One specific example of the amorphous metal soft magnetic material is an iron-phosphorus-carbon (Fe—P—C)-based amorphous magnetic alloy. In particular, a dust core containing powder of an Fe—P—C-based amorphous magnetic alloy can be used, in order to achieve low permeability (120 or less), a high saturation magnetic flux density (700 mT or more), and low core loss at high frequencies (e.g., 100 kHz or more).

Due to the same reasons for the magnetic cores of the aforementioned transformers (the first transformer 31 and the second transformer 32), the permeability (the initial permeability) of the magnetic core in the coil 34 can be set to values between 15 and 120. In one embodiment, the permeability of the magnetic core in the coil 34 can be set to values between 20 and 80. In another embodiment, the permeability of the magnetic core in the coil 34 can be set to values between 25 and 60. In one embodiment, the magnetic core of the coil 34 can be air-gapless, preventing the generation of leakage flux. In one embodiment, the saturation magnetic flux density of the magnetic core of the coil 34 can be 700 mT or greater. In another embodiment, the saturation magnetic flux density of the magnetic core of the coil 34 can be 0.9 T or greater. In another embodiment, the saturation magnetic flux density of the magnetic core of the coil 34 can be 1.1 T or greater. To meet aforementioned design requirements, the magnetic core of the coil 34 can be made using amorphous metal soft magnetic materials, nanocrystalline metal soft magnetic materials, similar to the magnetic cores of the transformers.

Second Embodiment

Figure 9:
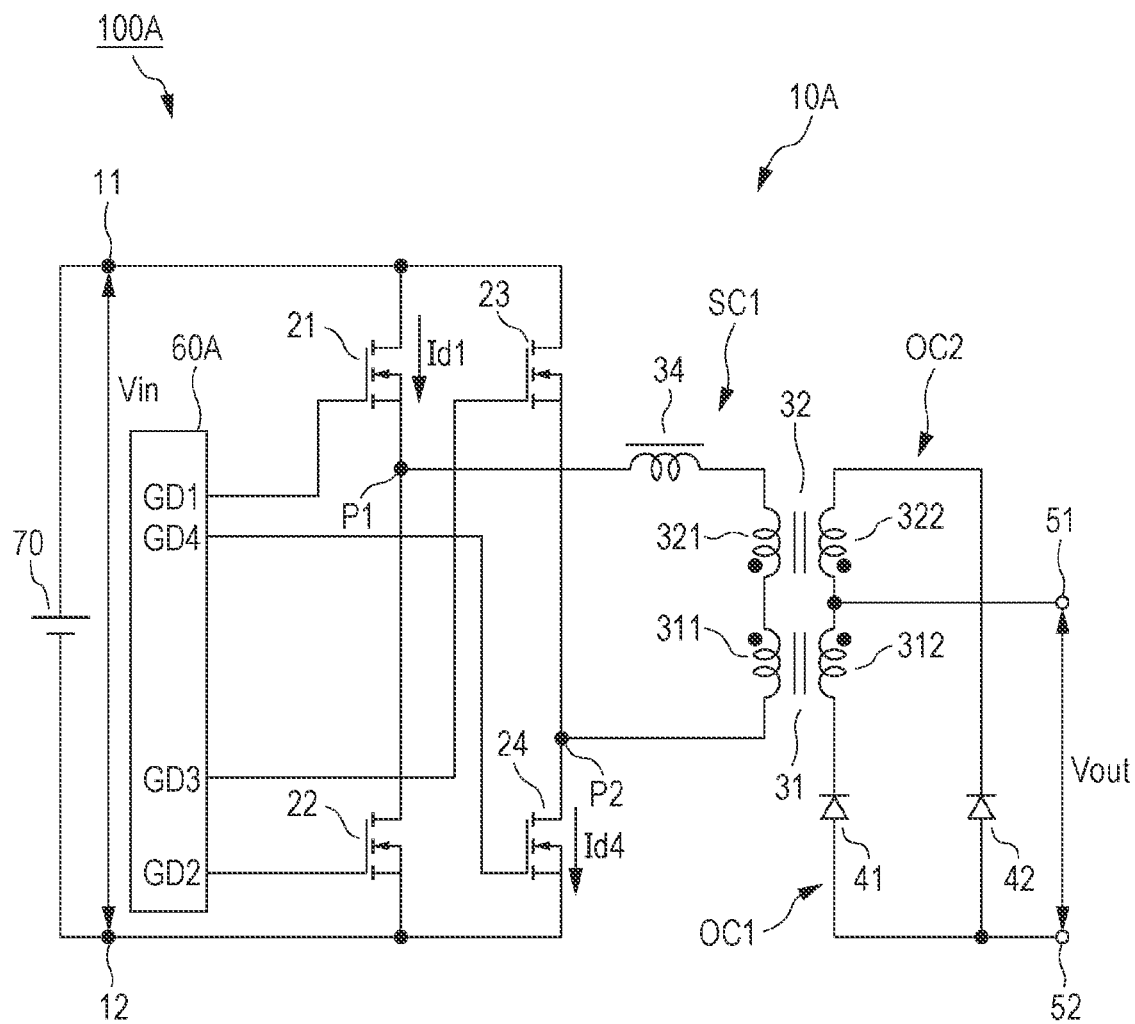
FIG. 9 is a circuit diagram of a power supply device according to a second embodiment.

FIG. 9 is a circuit diagram of a power supply device according to a second embodiment. As illustrated in FIG. 9, the circuit configuration of a DC voltage conversion circuit 10A included in a power supply device 100A according to the second embodiment can be similar to the circuit configuration of the DC voltage conversion circuit 10 included in the power supply device 100 according to the first embodiment (FIG. 9), except for the configuration of the controller 60A. The controller 60A in the DC voltage conversion circuit 10A includes a first gate drive GD1 configured to control a first switch 21, a second gate drive GD2 configured to control a second switch 22, a third gate drive GD3 configured to control a third switch 23, and a fourth gate drive GD4 configured to control a fourth switch 24. Since the circuit configuration of the DC voltage conversion circuit 10A can be similar to the circuit configuration of the DC voltage conversion circuit 10, except for the configuration of the controller 60A, mainly details of the controller 60A will be described below. The DC voltage conversion circuit 10A does not necessarily have to include the capacitor 33. Details are mentioned later.

Figure 10:
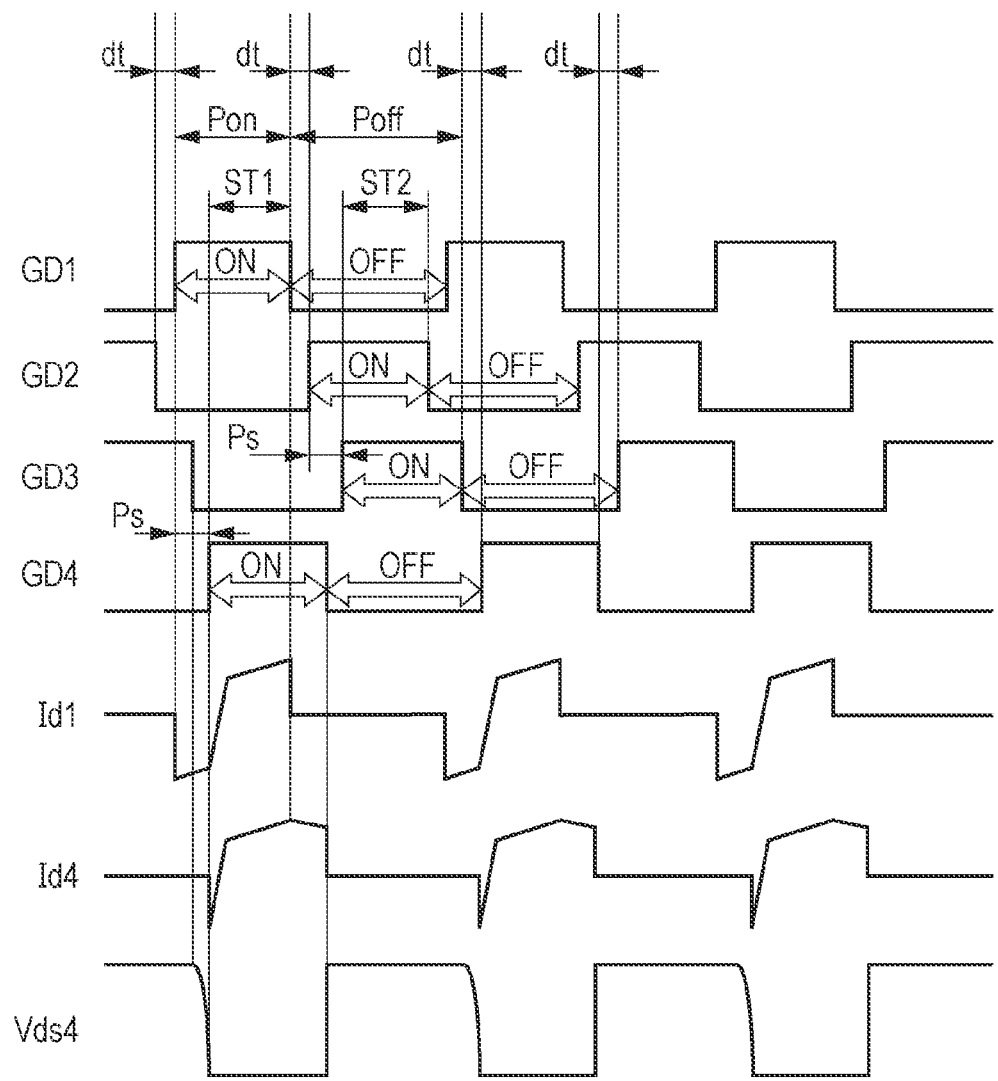
FIG. 10 is a timing chart of the circuit illustrated in FIG. 9.

FIG. 10 is a timing chart of the DC voltage conversion circuit 10A included in the power supply device 100A according to the second embodiment, illustrated in FIG. 9. The timing chart in FIG. 10 illustrates drain current Id1 in the first switch 21, drain current Id4 in the fourth switch 24, and a drain voltage Vds4 in the fourth switch 24, in conjunction with a timing chart of the first gate drive GD1 to the fourth gate drive GD4.

The controller 60A in the DC voltage conversion circuit 10A is similar to the controller 60 in the DC voltage conversion circuit 10 according to the first embodiment in that controller 60A performs on/off control alternately with a dead-time period dt to the first switch 21 and the second switch 22 and performs on/off control alternately with the dead-time period dt to the third switch 23 and the fourth switch 24. Also, in a first state ST1, the first switch 21 and the fourth switch 24 are in ON state. In a second state ST2, the second switch 22 and the third switch 23 are in ON state, similar to operation of the controller 60 in the DC voltage conversion circuit 10 according to the first embodiment. However, unlike the controller 60 in the DC voltage conversion circuit 10 according to the first embodiment, the controller 60A in the DC voltage conversion circuit 10A according to the second embodiment performs neither synchronization control to the first switch 21 and the fourth switch 24 nor synchronization control to the second switch 22 and the third switch 23. Instead, the controller 60A in the DC voltage conversion circuit 10A performs the phase shift control to the first to fourth switches 21 to 24, according to the process described below.

When a DC voltage is applied between a first input terminal 11 and a second input terminal 12, the controller 60A turns on and turns off the switches 21-24 repeatedly with the same duty ratio D that is smaller than 0.5. With respect to each switch, the total duration of an ON period Pon when the switch is in ON state and an OFF period Poff when the switch is in an OFF state corresponds to a single cycle of the switch. The reason why the duty ratio D is lower than 0.5 is because dead-time periods dt are assigned before and after the ON period Pon of each switch.

The controller 60A operates so that the timings when the second to fourth switches 22 to 24 are turned on differ from the timing when the first switch 21 is turned on.

First, if a shift period Ps has elapsed since the timing when the first switch 21 is turned on, the fourth switch 24 is turned on to cause the first state ST1. Here, the shift period Ps is a predetermined period of time which is shorter than the ON period Pon. According to the operation of the controller 60A in the DC voltage conversion circuit 10A, only the period when both the first switch 21 and the fourth switch 24 are in ON state correspond to the first state ST1, not the whole ON period Pon corresponding to the duration the first switch 21 is in ON state. Here, the fourth switch 24 is turned on having a phase shift with respect to the timing when the first switch 21 is turned on.

When the first switch 21 is turned off, the first state ST1 ends, and after elapse of the dead-time period dt, the second switch 22 is turned on.

Subsequently, if the shift period Ps has elapsed since the timing when the second switch 22 is turned on, the third switch 23 is turned on to cause the second state ST2. According to the operation of the controller 60A in the DC voltage conversion circuit 10A, only the period when both the second switch 22 and the third switch 23 are in ON state correspond to the second state ST2, not the whole ON period Pon corresponding to the duration the second switch 22 is in ON state. Here, the third switch 23 is turned on having a phase shift with respect to the timing when the second switch 22 is turned on.

Regarding the operation of the controller 60A in the DC voltage conversion circuit 10A, the length of the period of the first state ST1 and the length of the period of the second state ST2 can be adjusted to change the potential difference (an output voltage Vout) of the first output terminal 51 with respect to the second output terminal 52. For example, regarding the operation of the controller 60A, if the dead-time period dt is sufficiently shorter than the ON period Pon of each switch, the duty ratio D will be approximately 0.5. Thereby, the length of the shift period Ps can be changed, enabling the adjustment of the output voltage Vout. Here, the output voltage Vout, has a relation to the shift period Ps, described below.

$$Vout \propto Ps/(Pon+Poff)$$

where $0<Ps/(Pon+Poff)<0.5$

In the DC voltage conversion circuit 10 included in the power supply device 100 according to the first embodiment and the DC voltage conversion circuit 10A included in the power supply device 100A according to the second embodiment, four switches (the first to fourth switches 21 to 24) are included in a full-bridge circuit. In the DC voltage conversion circuit 10 according to the first embodiment, the first switch 21 and the fourth switch 24 can be controlled synchronously, and the second switch 22 and the third switch 23 can be controlled synchronously.

Thus, the capacitor 33, which is a DC blocking capacitor, can prevent large current from flowing into the series circuit part SC1. Since the four switches (the first to fourth switches 21 to 24) having the equal duty ratios D are turned on and off with shifted phases, large current it is less likely to have large current flowing into the series circuit part SC1. Thus, in the DC voltage conversion circuit 10A according to the second embodiment, the capacitor 33, which is a DC blocking capacitor, can be omitted in the series circuit part SC1.

Third Embodiment

Figure 11:
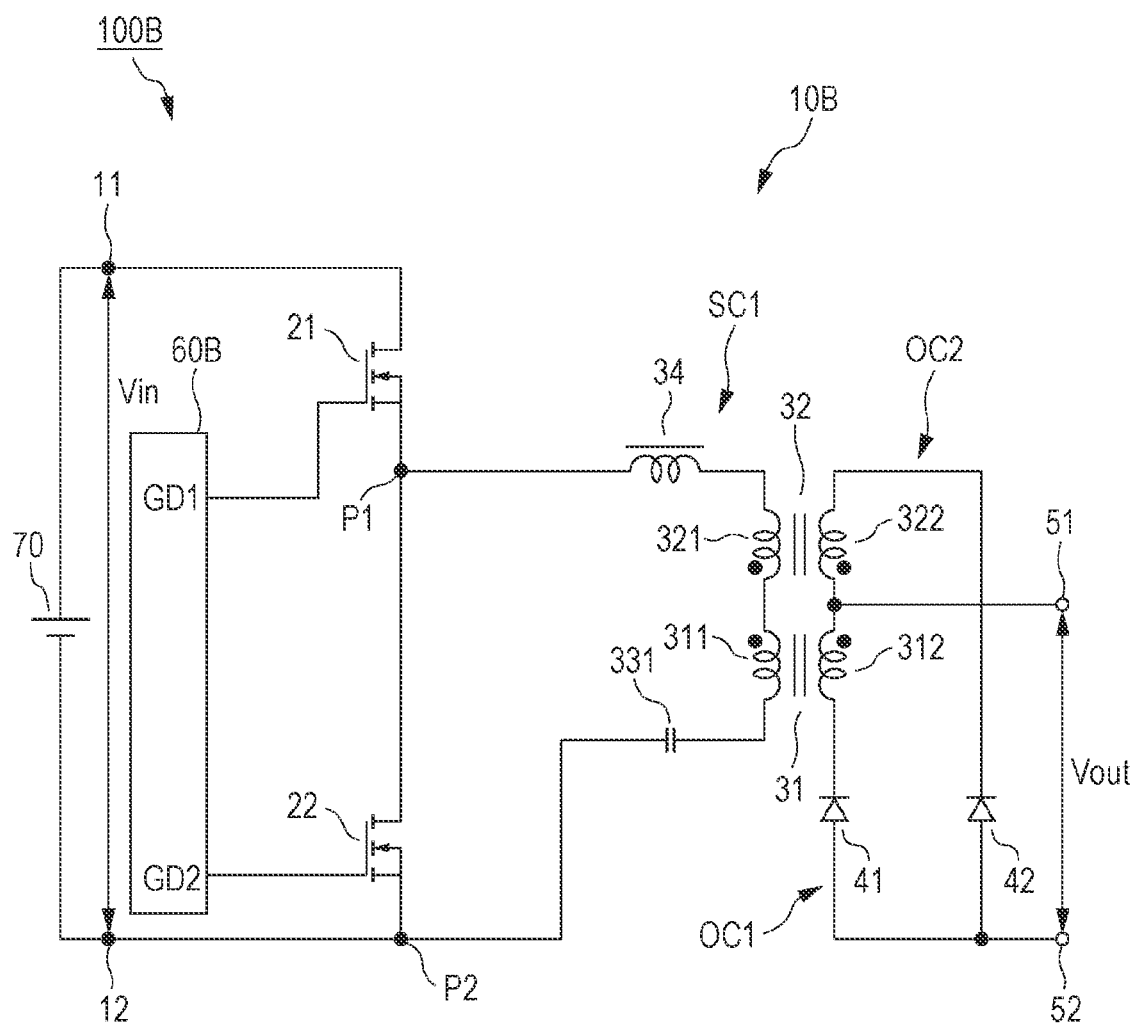
FIG. 11 is a circuit diagram of a power supply device according to a third embodiment.
Figure 12:
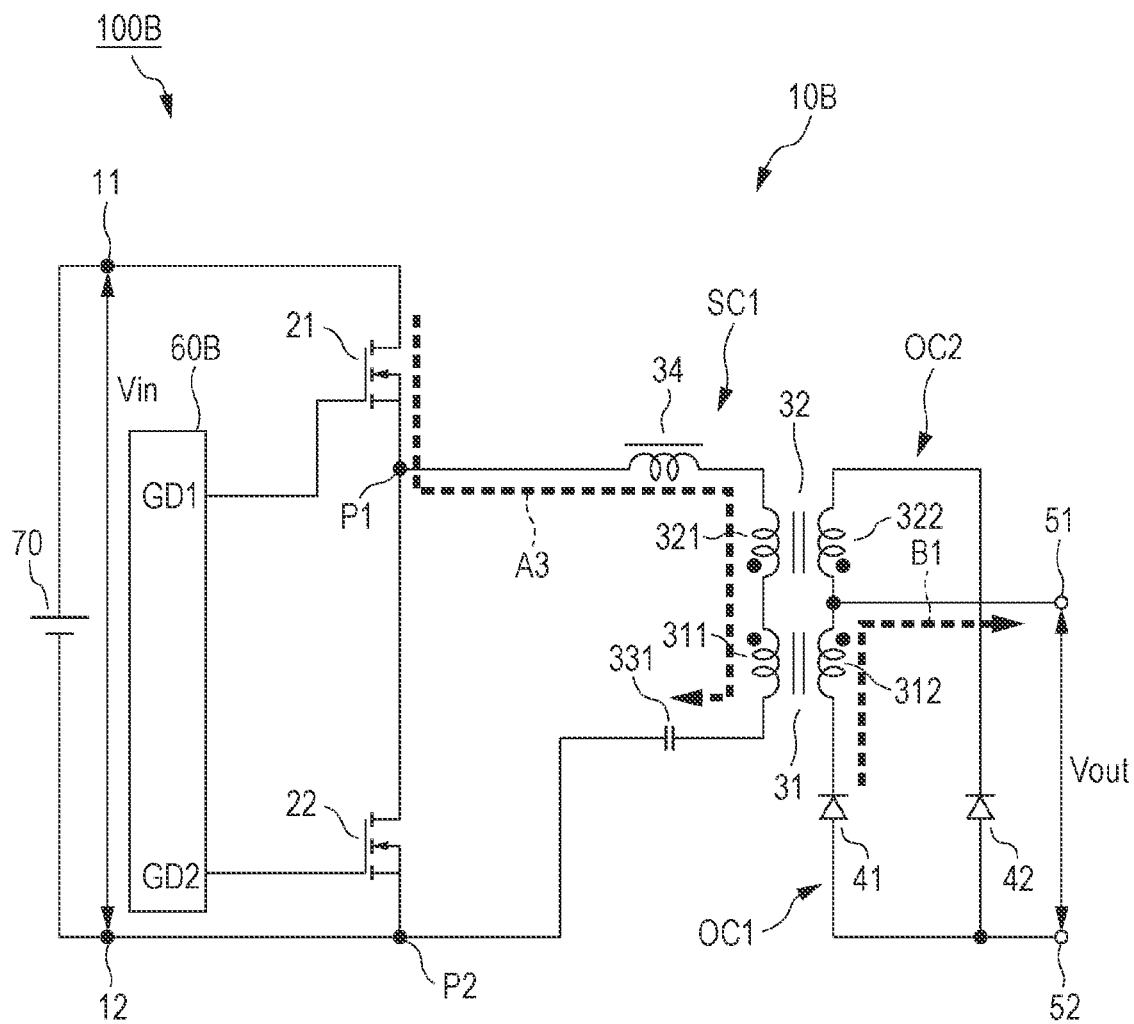
FIG. 12 is a diagram illustrating an operation when the circuit illustrated in FIG. 11 is in a first state if the first gate drive is ON and the second gate drive is OFF)
Figure 13:
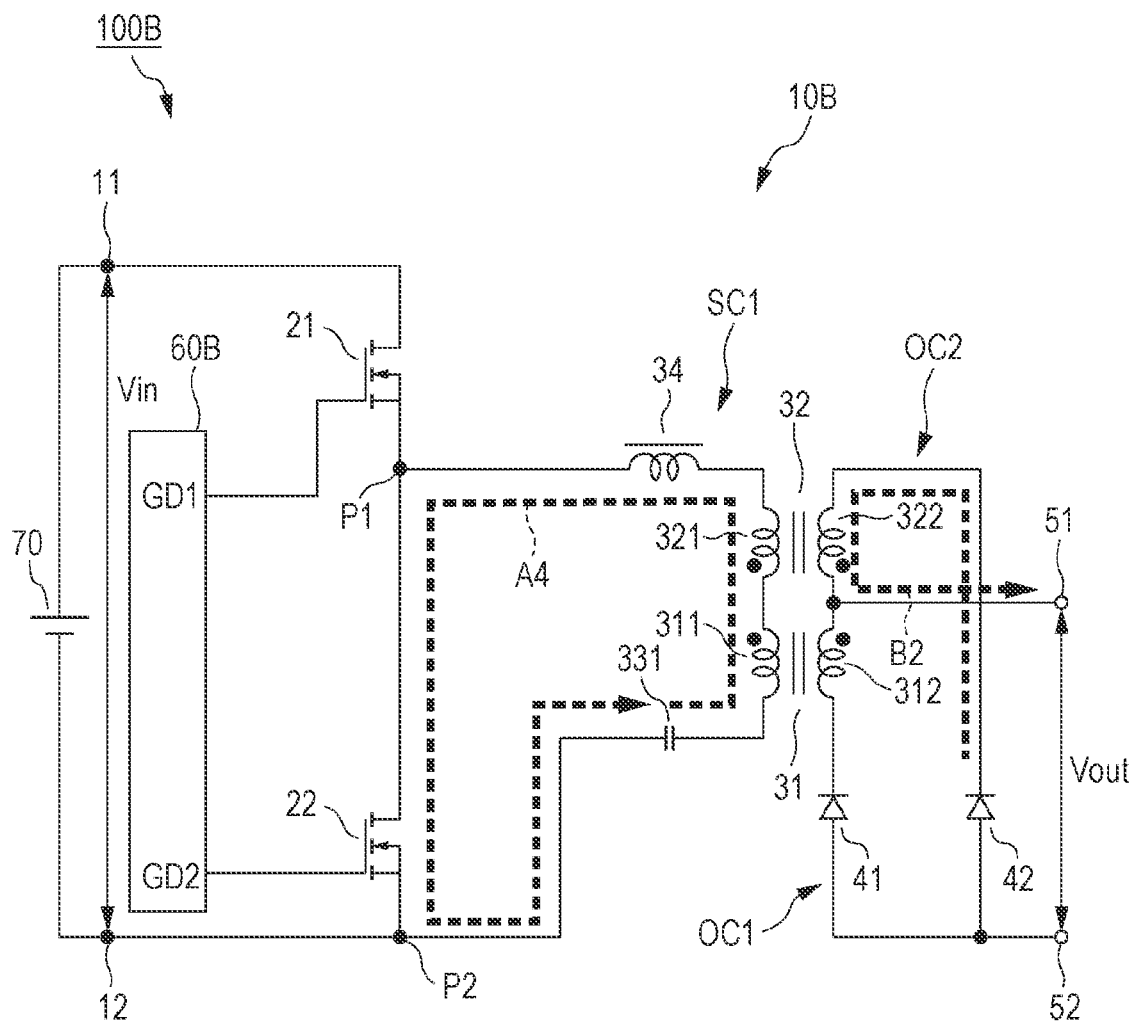
FIG. 13 is a diagram illustrating an operation when the circuit illustrated in FIG. 11 is in a second state (if the second gate drive is ON and the first gate drive is OFF)

A power supply device 100B according to a third embodiment will be described with reference to FIG. 11 to FIG. 13. FIG. 11 is a circuit diagram of a power supply device according to the third embodiment. FIG. 12 is a diagram illustrating an operation when the circuit illustrated in FIG. 11 is in the first state ST1 (when a first gate drive GD1 is in ON operation and a second gate drive GD2 is in OFF operation). FIG. 13 is a diagram illustrating the operation when the circuit illustrated in FIG. 11 is in the second state ST2 (when the second gate drive GD2 is in ON operation and the first gate drive GD1 is in OFF operation).

In the third embodiment, the full-bridge circuit of the first embodiment, including four switches is altered with a half-bridge circuit including two switches. Thus, DC voltage conversion circuit 10B included in the power supply device 100B has a half-bridge circuit including two switches. Comparing the DC voltage conversion circuit 10B according to the third embodiment with the DC voltage conversion circuit 10 according to the first embodiment, the half-bridge circuit including the series connection of the third switch 23 and the fourth switch 24 in the DC voltage conversion circuit 10 is omitted, and the second edge P2 of a series circuit part SC1 is electrically connected between the second switch 22 and the second input terminal 12.

Also, the DC voltage conversion circuit 10B according to the third embodiment, a first capacitor 331 is connected instead of the capacitor 33 (DC blocking capacitor). Thus, the primary side 311 of a first transformer 31 and the primary side 321 of a second transformer 32 are electrically connected in series with the first capacitor 331. Also, the first switch 21 is electrically connected in series with this series connection. Although, in FIG. 11, the first capacitor 331 is electrically connected between the series connection, including the primary side 311 of the first transformer 31 and the primary side 321 of the second transformer 32, and the second edge P2 of the series circuit part SC1, the configuration of the circuits are not limited thereto. The first capacitor 331 may be electrically connected in series with the series connection including the primary side 311 of the first transformer 31 and the primary side 321 of the second transformer 32. For example, the first capacitor 331 may be electrically connected between the series connection, including the primary side 311 of the first transformer 31 and the primary side 321 of the second transformer 32, and the first edge P1 of the series circuit part SC1. In the circuit illustrated in FIG. 11, a coil 34 is also electrically connected in series with the series connection including the primary side 311 of the first transformer 31 and the primary side 321 of the second transformer 32.

In the first state ST1, the first switch 21 is turned on. Thus, current flows in the series circuit part SC1 through a route indicated by an arrow A3 with a dashed-line, as illustrated in FIG. 12, accumulating charge in the first capacitor 331. At this timing, current flows in a first output circuit OC1 (as indicated by an arrow B1 with a black dashed-line), accumulating electrical energy in the second transformer 32.

As illustrated in FIG. 13, in the second state ST2 when the second switch 22 is turned on, the charge accumulated in the first capacitor 331 in the first state ST1 is released, causing current flowing in the series circuit part SC1 in a direction (indicated by an arrow A4 with a dashed-line) opposite to the direction (indicated by the arrow A3 with dashed-line) in the first state ST1. At this timing, current flows in a second output circuit OC2 (as indicated by an arrow B2 with a dashed-line), accumulating electrical energy in the first transformer 31.

A controller 60B in the DC voltage conversion circuit 10B according to the third embodiment is configured to operate similarly to the controller 60 in the DC voltage conversion circuit 10 according to the first embodiment. Specifically, the controller 60B performs on/off control alternately with a dead-time period dt to the first switch 21 and the second switch 22. Also, adjusting at least either the duty ratio D1 of the first switch 21 or the duty ratio D2 of the second switch 22 enables the potential difference (an output voltage Vout) of a first output terminal 51 with respect to a second output terminal 52 to change. Since the duty ratio D1 of the first switch 21 and the duty ratio D2 of the second switch 22 are not equal (asymmetric), a DC blocking capacitor can be implemented to prevent large current from flowing into the series circuit part SC1. In the DC voltage conversion circuit 10B, the first capacitor 331 prevents large current from flowing. A capacitor 33, which operates as a DC blocking capacitor, can be implemented besides the first capacitor 331.

Fourth Embodiment

Figure 14:
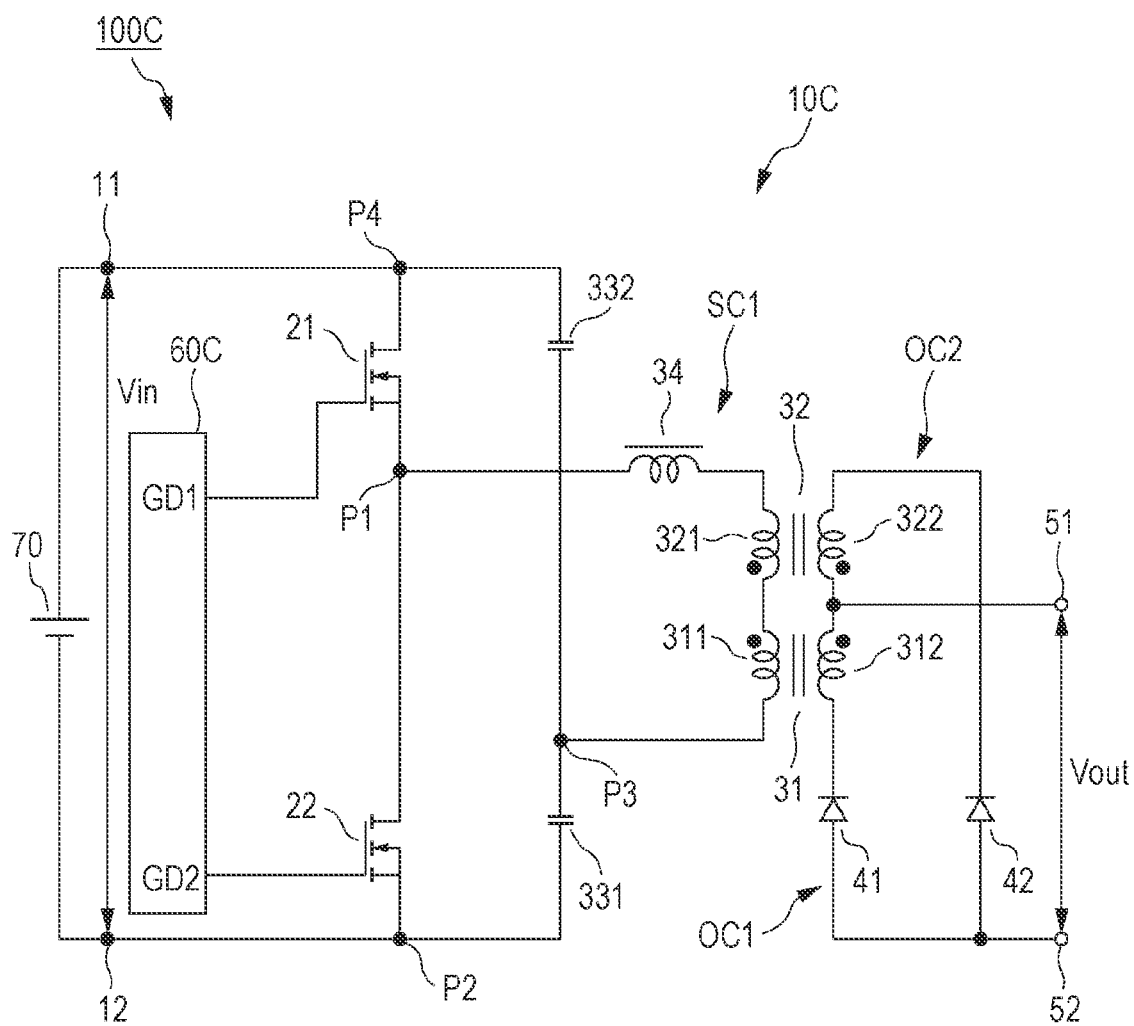
FIG. 14 is a circuit diagram of a power supply device according to a fourth embodiment.
Figure 15:
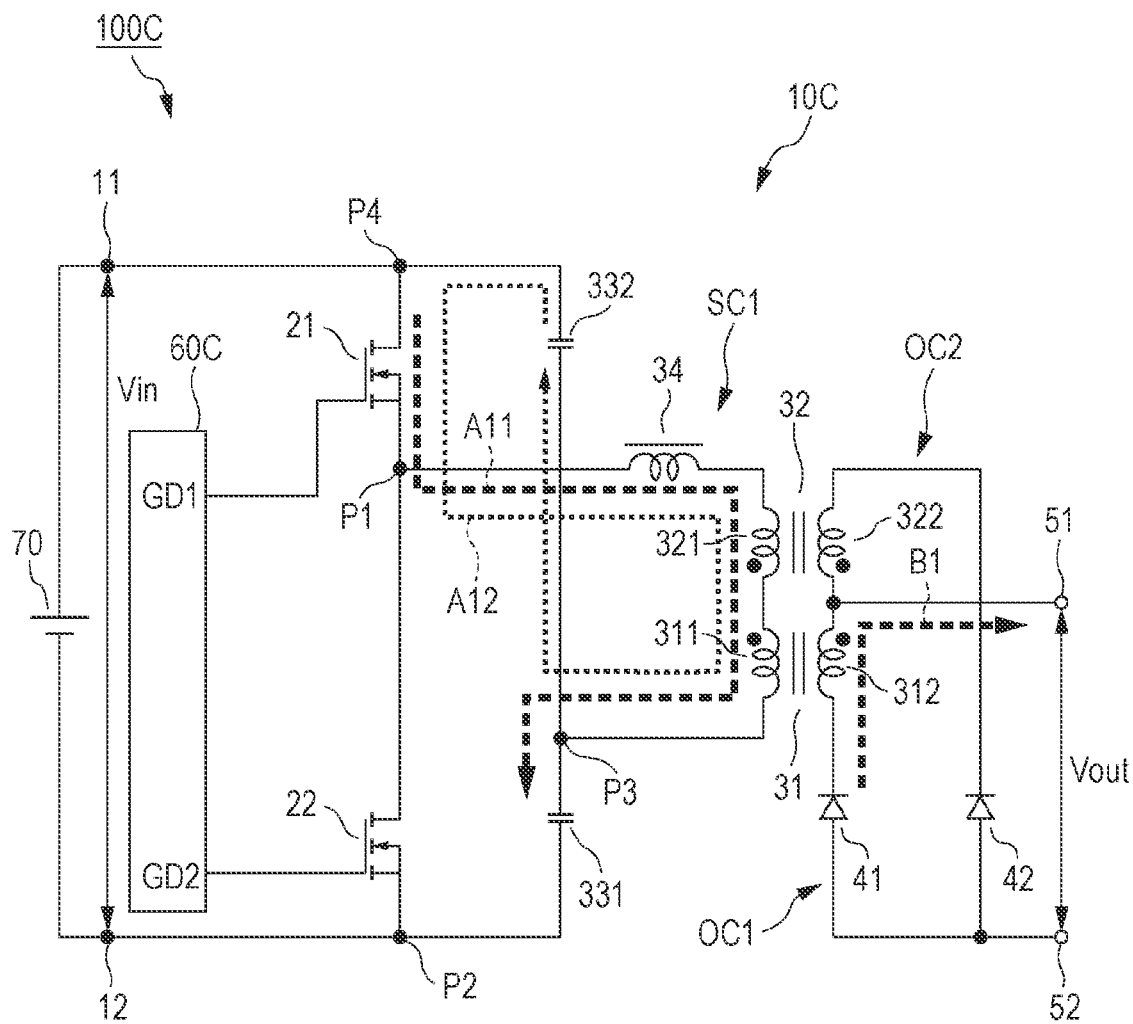
FIG. 15 is a diagram illustrating an operation when the circuit illustrated in FIG. 14 is in a first state (if the first gate drive is ON and the second gate drive is OFF)
Figure 16:
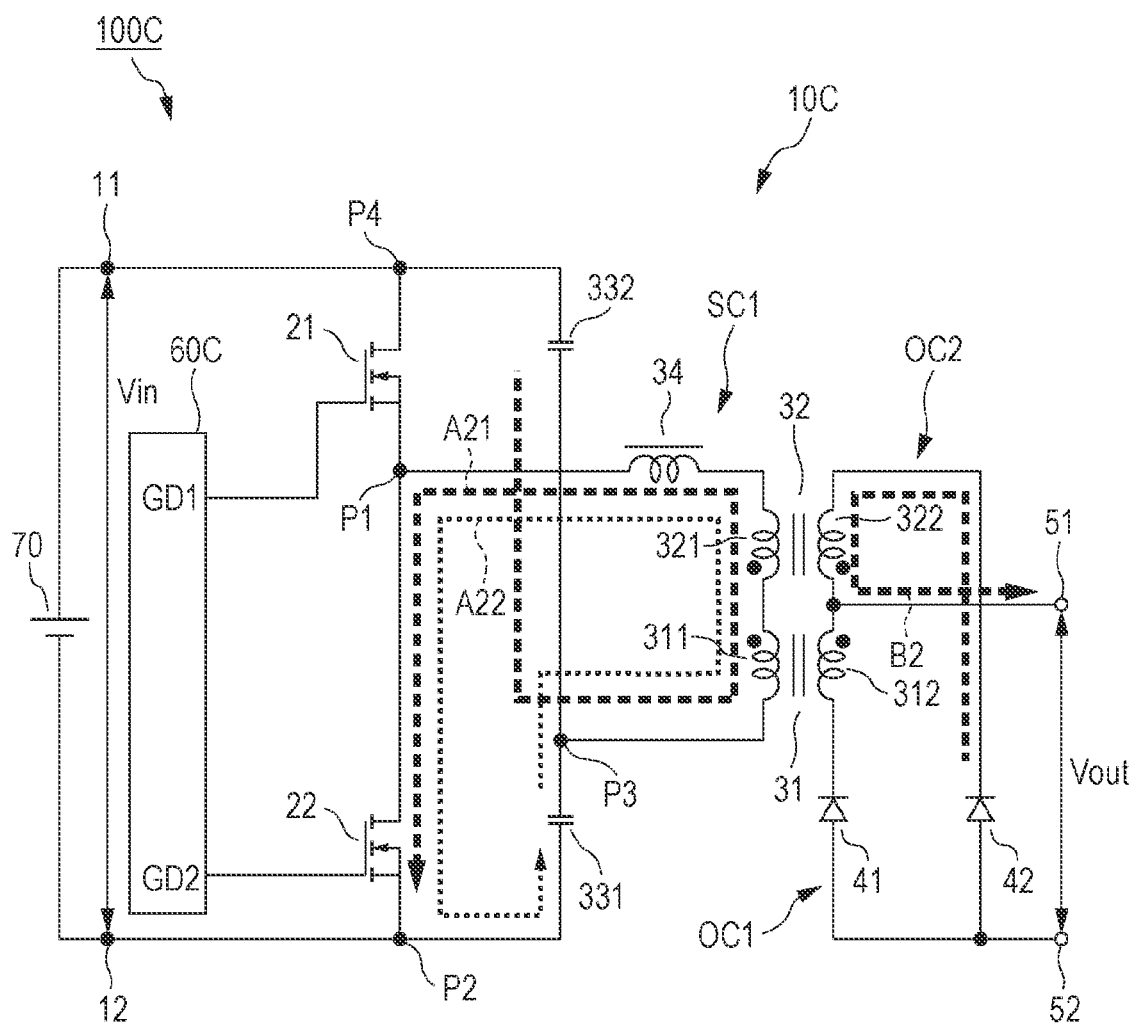
FIG. 16 is a diagram illustrating an operation when the circuit illustrated in FIG. 14 is in a second state (if the second gate drive is ON and the first gate drive is OFF).

A power supply device 100C according to a fourth embodiment will be described with reference to FIGS. 14 to 16. FIG. 14 is a circuit diagram of a power supply device according to the fourth embodiment. FIG. 15 is a diagram illustrating the operation when the circuit illustrated in FIG. 14 is in the first state ST1 (when a first gate drive GD1 is in ON operation and a second gate drive GD2 is in OFF operation). FIG. 16 is a diagram illustrating the operation when the circuit illustrated in FIG. 14 is in the second state ST2 (when the second gate drive GD2 is in ON operation and the first gate drive GD1 is in OFF operation).

Comparing the DC voltage conversion circuit 10C included in the power supply device 100C according to the fourth embodiment with the DC voltage conversion circuit 10B included in the power supply device 100B according to the third embodiment, the series circuit part SC1 further includes a second capacitor 332 electrically connected in series with a series connection including a primary side 311 of a first transformer 31 and a primary side 321 of a second transformer 32. The second switch 22 is electrically connected in series with the primary side 311 of the first transformer 31 and a series connection including the primary side 321 of the second transformer 32 and the second capacitor 332. In the circuit illustrated in FIG. 14, a coil 34 is also electrically connected in series with a series connection including the primary side 311 of the first transformer 31 and the primary side 321 of the second transformer 32.

More specifically, a first capacitor 331 is electrically connected between the second edge P2 of the series circuit part SC1 and the series connection including the primary side 311 of the first transformer 31 and the primary side 321 of the second transformer 32. One edge (a third edge P3) of the second capacitor 332 is electrically connected between the first capacitor 331 and the series connection including the primary side 311 of the first transformer 31 and the primary side 321 of the second transformer 32. Another edge (a fourth end part P4) of the second capacitor 332 is electrically connected to a first input terminal 11. Accordingly, the first capacitor 331 and the second capacitor 332 are electrically connected in series, and this series connection is electrically connected between the first input terminal 11 and a second input terminal 12. Compared to the DC voltage conversion circuit 10 according to the first embodiment, in the DC voltage conversion circuit 10C according to the fourth embodiment, the second capacitor 332 is replaces the third switch 23, and the first capacitor 331 replaces the fourth switch 24.

As illustrated in FIG. 15, during the first state ST1, current from the first input terminal 11 flows in the primary side 311 of the first transformer 31 and the series connection including the primary side 321 of the second transformer 32 and a first switch 21 to form a current route (as indicated by an arrow A11 with a dashed-line) thereby accumulating charge in the first capacitor 331. Also, charge accumulated in the second capacitor 332 is released, generating current flowing in a direction indicated by an arrow A12 with a dotted-line, forming a closed circuit including the first switch 21, the second capacitor 332 and the series connection including the primary side 311 of the first transformer 31 and the primary side 321 of the second transformer 32. At this timing, current flows in a first output circuit OC1 (as indicated by an arrow B1 with a dashed-line), accumulating electrical energy in the second transformer 32.

As illustrated in FIG. 16, during the second state ST2, current flows to the second input terminal 12 through the primary side 311 of the first transformer 31 and the series connection including the primary side 321 of the second transformer 32 and the second switch 22 forming a current route (indicated by an arrow A21 with a dashed-line) accumulating charge in the second capacitor 332. Also, the charge accumulated in the first capacitor 331 is released, generating a current in the direction indicated by an arrow A22 with a dotted-line flowing in a closed circuit including the second switch 22, the first capacitor 331 and the series connection including the primary side 311 of the first transformer 31 and the primary side 321 of the second transformer 32. At this timing, current flows in a second output circuit OC2 (as indicated by an arrow B2 with a dashed-line), accumulating electrical energy in the first transformer 31.

The controller 60C in the DC voltage conversion circuit 10C according to the fourth embodiment operates similarly to the controller 60 in the DC voltage conversion circuit 10 according to the first embodiment. Specifically, the controller 60C performs on/off control alternately with a dead-time period dt to the first switch 21 and the second switch 22. Also, adjusting at least either the duty ratio D1 of the first switch 21 or the duty ratio D2 of the second switch 22 enables to change the potential difference (an output voltage Vout) of the first output terminal 51 with respect to a second output terminal 52. Since the duty ratio D1 of the first switch 21 and the duty ratio D2 of the second switch 22 are not equal (asymmetric), a DC blocking capacitor for preventing large current from flowing into the series circuit part SC1 can be used. In the DC voltage conversion circuit 10C, the first capacitor 331 and the second capacitor 332 can prevent large current from flowing. A capacitor 33, which operates as a DC blocking capacitor, may be implemented in addition to the first capacitor 331 and the second capacitor 332.

The embodiments above have been described for ease of understanding of the present disclosure and are not intended to limit the present disclosure. It is, therefore, to be understood that the elements disclosed in the embodiments above include all design changes and equivalents are within to the technical scope of the present disclosure.

For example, although, in each of the DC voltage conversion circuits according to the first to fourth embodiments described above, the inductors, such as the coil 34, form a resonance circuit with the output capacitances of the plurality of switches (the first to fourth switches 21 to 24), and the maximum amplitude voltage of the resonance circuit is set to greater values than the drain voltages of the switches to perform zero voltage switching, the present disclosure is not limited thereto. When the DC voltage conversion circuit is implemented in a power supply device for a display or an information processing device, zero voltage switching can be used to inhibit generation of noise. However, for applications where effects from noise are relatively limited, such as a power supply device in a charging stand for an electric vehicle, increasing the maximum amplitude voltage of the resonance circuit does not always have to be increased. For example, hard switching regardless of the generation of surge voltages or surge currents can be used. In this embodiment, since it is not necessary to satisfy the resonance conditions for enabling zero voltage switching, the controllable range of the DC voltage conversion circuit becomes wider, enabling quick charging at a charging stand, for example.

If hard switching is used, the resonance circuit can be omitted. Thus, the coil 34 included in the series circuit part SC1 of the DC voltage conversion circuit according to each of the embodiments can be omitted. Also, in the timing chart illustrated in FIG. 2, the duty ratio D1 of the first gate drive GD1 and the duty ratio D2 of the second gate drive GD2 can be equal (i.e., D1=D2). If switching is performed so that the duty ratios are approximately equal, flow of current into the series circuit part SC1 can be reduced. Therefore, the capacitor 33, which operates as a DC blocking capacitor can be omitted.

The DC voltage conversion circuit according to one embodiment of the present disclosure can be used as a circuit applied to a high-power output switching power source.

The invention claimed is:

1. A direct-current voltage conversion circuit comprising:
   a first input terminal and a second input terminal;
   a first switch having one edge electrically connected to the first input terminal;
   a second switch having one edge electrically connected to the second input terminal;
   a series circuit in which a primary side of a first transformer and a primary side of a second transformer are electrically connected in series;
   a first output terminal and a second output terminal;
   a first output circuit that includes: each edge at the first output terminal and the second output terminal, and a secondary side of the first transformer;
   a second output circuit that includes: each edge at the second output terminal and the second output terminal, and a secondary side of the second transformer; and
   a controller configured to control the first switch and the second switch;
   wherein the first transformer includes a magnetic core, the second transformer includes a magnetic core, and the first transformer and the second transformer have a same polarity and are magnetically independent;
   wherein the first switch and the second switch are electrically connected in series, and one edge of the series circuit part is electrically connected between the first switch and the second switch;
   wherein, the controller is configured to:
   perform on/off control alternately with a dead-time period to the first switch and the second switch, alternating direction of current flowing in the series circuit part, if a direct-current voltage is applied between the first input terminal and the second input terminal; and
   cause:
   a first state in which the first switch is turned on with current flowing in the first output circuit to a direction to the first output terminal side from the second output terminal side, accumulating electrical energy in the second transformer without flowing induced current in the second output circuit; and
   a second state in which the second switch is turned on with current flowing in the second output circuit to a direction to the second output terminal side from the first output terminal side, accumulating electrical energy in the first transformer, without flowing induced current in the first output circuit, alternately; and
   wherein permeability of a magnetic core in the first transformer and permeability of a magnetic core in the second transformer is between 15 and 120, and a saturation magnetic flux density of the magnetic core in the first transformer and a saturation magnetic flux density of the magnetic core in the second transformer is 700 mT or greater.

2. The direct-current voltage conversion circuit according to claim 1,
   wherein the series circuit further includes a first capacitor that is electrically connected in series with the primary side of the first transformer and the primary side of the second transformer, and the first switch is electrically connected in series with the primary side of the first transformer and a series connection including the primary side of the second transformer and the first capacitor;
   another edge of the series circuit is electrically connected between the second switch and the second input terminal;
   in the first state, charge is accumulated in the first capacitor; and
   in the second state, the charge accumulated in the first capacitor is released.

3. The direct-current voltage conversion circuit according to claim 2,
   wherein the series circuit further includes a second capacitor electrically connected in series with the primary side of the first transformer and the primary side of the second transformer, and the second switch is electrically connected in series with the primary side of the first transformer and a series connection including the primary side of the second transformer and the second capacitor;
   the first capacitor is electrically connected between the other edge of the series circuit and a series connection including the primary side of the first transformer and the primary side of the second transformer;
   one edge of the second capacitor is electrically connected between the first capacitor and the series connection, including the primary side of first transformer and the primary side of the second transformer, and another edge of the second capacitor is electrically connected to the first input terminal;
   wherein:
   in the first state, charge is accumulated in the first capacitor, and the charge accumulated in the second capacitor is released; and
   in the second state, charge is accumulated in the second capacitor, and the charge accumulated in the first capacitor is released.

4. The direct-current voltage conversion circuit according to claim 1,
- wherein the plurality of switches further includes a third switch and a fourth switch, the third switch electrically connected between another edge of the series circuit and the first input terminal, and the fourth switch electrically connected between the other end of the series circuit and the second input terminal;
- the third switch and the fourth switch are electrically connected in series, and the other edge of the series circuit is electrically connected between the third switch and the fourth switch;
- when a direct-current voltage is applied between the first input terminal and the second input terminal, the controller performs on/off control alternately having the dead-time period to the third switch and the fourth switch;
- wherein:
- in the first state, the first switch and the fourth switch are turned on; and
- in the second state, the second switch and the third switch are turned on.

5. The direct-current voltage conversion circuit according to claim 4,
- wherein the series circuit further includes a capacitor electrically connected in series with the primary side of the first transformer and the primary side of the second transformer;
- wherein, when a direct-current voltage is applied between the first input terminal and the second input terminal, the controller is configured to
- control the first switch and the fourth switch synchronously and control the second switch and the third switch synchronously so that
- at least either a duty ratio of the first switch or a duty ratio of the second switch are changed, enabling a potential difference of the first output terminal with respect to the second output terminal to change.

6. The direct-current voltage conversion circuit according to claim 4,
- wherein, when a direct-current voltage is applied between the first input terminal and the second input terminal, the controller is configured to
- turn on and turn off each of the first to fourth switches repeatedly with a same duty ratio that is smaller than 50%;
- wherein with respect to timings at which the second switch, the third switch, and the fourth switch are turned on, the controller is configured to:
- turn on the fourth switch to cause the first state, if a shift period has elapsed since the first switch is turned on, the shift period is a predetermined duration shorter than an on period of the first switch;
- turn on the second switch, if the dead-time period has elapsed since the first switch is turned off; and
- turn on the third switch to cause the second state, if the shift period has elapsed since the second switch is turned on; and
- wherein the controller is configured to change a duration of the first state and a duration of the second state thereby changing a potential difference of the first output terminal with respect to the second output terminal.

7. The direct-current voltage conversion circuit according to claim 1,
- wherein neither the magnetic core of the first transformer nor the magnetic core of the second transformer have an air gap.

8. The direct-current voltage conversion circuit according to claim 1,
- wherein the magnetic core of the first transformer and the magnetic core of the second transformer comprises a dust core containing amorphous metal soft magnetic material.

9. The direct-current voltage conversion circuit according to claim 1,
- wherein each of the switches have a field-effect transistor.

10. The direct-current voltage conversion circuit according to claim 9, further comprising:
- a resonance circuit including an output capacitance of the field-effect transistor in at least either of the switches, and a resonance condition of the resonance circuit is set to ensure that, when at least either of the switches is turned off, a drain voltage of the field-effect transistor of the at least either of the switches reaches 0 V or lower.

11. The direct-current voltage conversion circuit according to claim 10,
- wherein the series circuit further includes a coil electrically connected in series with at least either of the switches, and the resonance circuit includes the coil.

12. The direct-current voltage conversion circuit according to claim 11,
- wherein a permeability of a magnetic core of the coil is between 15 and 120.

13. The direct-current voltage conversion circuit according to claim 12,
- wherein the magnetic core of the coil does not have an air gap part.

14. The direct-current voltage conversion circuit according to claim 11,
- wherein a saturation magnetic flux density of the magnetic core of the coil is 700 mT or greater.

15. A power supply device comprising:
- a direct-current voltage conversion circuit comprising:
- a first input terminal and a second input terminal;
- a first switch having one edge electrically connected to the first input terminal;
- a second switch having one edge electrically connected to the second input terminal;
- a series circuit in which a primary side of a first transformer and a primary side of a second transformer are electrically connected in series;
- a first output terminal and a second output terminal;
- a first output circuit that includes: each edge at the first output terminal and the second output terminal; and a secondary side of the first transformer;
- a second output circuit that includes: each edge at the second output terminal and the second output terminal; and a secondary side of the second transformer; and
- a controller configured to control the first switch and the second switch,
- wherein the first transformer includes a magnetic core, the second transformer includes a magnetic core, and the first transformer and the second transformer have a same polarity and are magnetically independent;
- wherein the first switch and the second switch are electrically connected in series, and one edge of the series circuit part is electrically connected between the first switch and the second switch;

wherein, the controller is configured to:
perform on/off control alternately with a dead-time period to the first switch and the second switch, alternating direction of current flowing in the series circuit part, if a direct-current voltage is applied between the first input terminal and the second input terminal; and
cause:
a first state in which the first switch is turned on with current flowing in the first output circuit to a direction to the first output terminal side from the second output terminal side, accumulating electrical energy in the second transformer without flowing induced current in the second output circuit; and
a second state in which the second switch is turned on with current flowing in the second output circuit to a direction to the second output terminal side from the first output terminal side, accumulating electrical energy in the first transformer, without flowing induced current in the first output circuit, alternately; and
wherein permeability of a magnetic core in the first transformer and permeability of a magnetic core in the second transformer is between 15 and 120; and a saturation magnetic flux density of the magnetic core in the first transformer and a saturation magnetic flux density of the magnetic core in the second transformer is 700 mT or greater; and
a direct-current power supply electrically connected to each of the first input terminal and the second input terminal included in the direct-current voltage conversion circuit.

* * * * *